US012707409B2

(12) United States Patent
Park et al.

(10) Patent No.: US 12,707,409 B2
(45) Date of Patent: Aug. 11, 2026

(54) REFERENCE TIMING FOR UPLINK SIGNALING IN A NON-TERRESTRIAL NETWORK

(71) Applicant: QUALCOMM Incorporated, San Diego, CA (US)

(72) Inventors: Changhwan Park, San Diego, CA (US); Xiao Feng Wang, San Diego, CA (US); Jae Ho Ryu, San Diego, CA (US); Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 551 days.

(21) Appl. No.: 18/068,993

(22) Filed: Dec. 20, 2022

(65) Prior Publication Data

US 2023/0224839 A1 Jul. 13, 2023

Related U.S. Application Data

(60) Provisional application No. 63/266,566, filed on Jan. 7, 2022.

(51) Int. Cl.
*H04W 56/00* (2009.01)
*H04W 84/06* (2009.01)

(52) U.S. Cl.
CPC ........ *H04W 56/0045* (2013.01); *H04W 84/06* (2013.01)

(58) Field of Classification Search
CPC ......... H04W 56/0045; H04W 56/0005; H04W 56/0015; H04W 84/06

(Continued)

(56) References Cited

U.S. PATENT DOCUMENTS

2019/0342845 A1* 11/2019 Laselva ............. H04W 72/0446
2021/0105761 A1* 4/2021 Cheng ................... H04L 5/0053
2023/0099762 A1* 3/2023 Khoshkholgh Dashtaki .............. H04W 72/23 370/350

OTHER PUBLICATIONS

Ericsson: "On UL Time and Frequency Synchronization Enhancements for NTN", 3GPP TSG-RAN WG1 Meeting #106bis-e, R1-2109928, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 1, 2021, XP052058846, 31 Pages, The Whole Document, Sections 1-7, Figures 1 4,12, Tables 1-4.

(Continued)

*Primary Examiner* — Ricardo H Castaneyra
(74) *Attorney, Agent, or Firm* — Harrity & Harrity LLP/ QUALCOMM Incorporated

(57) ABSTRACT

Various aspects of the present disclosure generally relate to wireless communication. In some aspects, a user equipment (UE) may receive, from a serving node associated with a non-terrestrial network (NTN), one or more timing advance (TA) values. The UE may transmit, to the serving node of the NTN, uplink signaling based at least in part on a reference timing for the uplink signaling, wherein the reference timing for the uplink signaling is based at least in part on a reference timing of a downlink signaling and the one or more TA values, wherein the one or more TA values include a UE-specific TA value, and wherein a reference timing of the UE-specific TA value is for: a first propagation delay on a service link between the UE and a satellite associated with the NTN, and a second propagation delay on the service link. Numerous other aspects are described.

30 Claims, 18 Drawing Sheets

(58) Field of Classification Search
USPC ......................... 370/329, 503, 350; 455/12.1
See application file for complete search history.

(56) References Cited

OTHER PUBLICATIONS

International Search Report and Written Opinion—PCT/US2022/082150—ISA/EPO—Apr. 4, 2023.

* cited by examiner

800

REFERENCE TIMING FOR UPLINK SIGNALING IN A NON-TERRESTRIAL NETWORK

CROSS-REFERENCE TO RELATED APPLICATION

This patent application claims priority to U.S. Provisional Patent Application No. 63/266,566, filed on Jan. 7, 2022, entitled "REFERENCE TIMING FOR UPLINK SIGNALING IN A NON-TERRESTRIAL NETWORK," and assigned to the assignee hereof. The disclosure of the prior application is considered part of and is incorporated by reference into this patent application in its entirety.

INTRODUCTION

Aspects of the present disclosure generally relate to wireless communication and to techniques and apparatuses for communications in non-terrestrial networks (NTNs).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors coupled to the memory. The one or more processors may be configured to receive, from a serving node of a non-terrestrial network (NTN), one or more timing advance (TA) values. The one or more processors may be configured to transmit, to the serving node of the NTN, uplink signaling based at least in part on a reference timing for the uplink signaling, wherein the reference timing for the uplink signaling is based at least in part on a reference timing of a downlink signaling and the one or more TA values, wherein the one or more TA values include a UE-specific TA value, and wherein a reference timing of the UE-specific TA value is for: a first propagation delay on a service link between the UE and a satellite associated with the NTN, and a second propagation delay on the service link.

In some implementations, an apparatus for wireless communication at a serving node includes a memory and one or more processors coupled to the memory. The one or more processors may be configured to output one or more TA values. The one or more processors may be configured to obtain uplink signaling based at least in part on a reference timing for the uplink signaling, wherein the reference timing for the uplink signaling is based at least in part on a reference timing of a downlink signaling and the one or more TA values, wherein the one or more TA values include a UE-specific TA value, and wherein a reference timing of the UE-specific TA value is for: a first propagation delay on a service link between the UE and a satellite associated with the NTN, and a second propagation delay on the service link.

In some implementations, a method of wireless communication performed by a UE includes receiving, from a serving node of an NTN, one or more TA values. The method includes transmitting, to the serving node of the NTN, uplink signaling based at least in part on a reference timing for the uplink signaling, wherein the reference timing for the uplink signaling is based at least in part on a reference timing of a downlink signaling and the one or more TA values, wherein the one or more TA values include a UE-specific TA value, and wherein a reference timing of the UE-specific TA value is for: a first propagation delay on a service link between the UE and a satellite associated with the NTN, and a second propagation delay on the service link.

In some implementations, a method of wireless communication performed by a serving node includes outputting one or more TA values. The method includes obtaining uplink signaling based at least in part on a reference timing for the uplink signaling, wherein the reference timing for the uplink signaling is based at least in part on a reference timing of a downlink signaling and the one or more TA values, wherein the one or more TA values include a UE-specific TA value, and wherein a reference timing of the UE-specific TA value is for: a first propagation delay on a service link between the UE and a satellite associated with the NTN, and a second propagation delay on the service link.

In some implementations, a non-transitory computer-readable medium storing a set of instructions for wireless communication includes one or more instructions that, when executed by one or more processors of a UE, cause the UE to receive, from a serving node of an NTN, one or more TA values. The one or more instructions, when executed by the one or more processors of the UE, cause the UE to transmit, to the serving node of the NTN, uplink signaling based at least in part on a reference timing for the uplink signaling, wherein the reference timing for the uplink signaling is based at least in part on a reference timing of a downlink signaling and the one or more TA values, wherein the one or more TA values include a UE-specific TA value, and wherein a reference timing of the UE-specific TA value is for: a first propagation delay on a service link between the UE and a satellite associated with the NTN, and a second propagation delay on the service link.

In some implementations, a non-transitory computer-readable medium storing a set of instructions for wireless communication includes one or more instructions that, when executed by one or more processors of a serving node, cause the serving node to output one or more TA values. The one or more instructions, when executed by the one or more processors of the serving node, cause the serving node to obtain uplink signaling based at least in part on a reference timing for the uplink signaling, wherein the reference timing for the uplink signaling is based at least in part on a reference timing of a downlink signaling and the one or more TA values, wherein the one or more TA values include a UE-specific TA value, and wherein a reference timing of the UE-specific TA value is for: a first propagation delay on a service link between the UE and a satellite associated with the NTN, and a second propagation delay on the service link.

In some implementations, an apparatus for wireless communication includes means for receiving, from a serving node of an NTN, one or more TA values. The apparatus includes means for transmitting, to the serving node of the NTN, uplink signaling based at least in part on a reference timing for the uplink signaling, wherein the reference timing for the uplink signaling is based at least in part on a reference timing of a downlink signaling and the one or more TA values, wherein the one or more TA values include an apparatus-specific TA value, and wherein a reference timing of the apparatus-specific TA value is for: a first propagation delay on a service link between the apparatus and a satellite associated with the NTN, and a second propagation delay on the service link.

In some implementations, an apparatus for wireless communication includes means for outputting one or more TA values. The apparatus includes means for obtaining uplink signaling based at least in part on a reference timing for the uplink signaling, wherein the reference timing for the uplink signaling is based at least in part on a reference timing of a downlink signaling and the one or more TA values, wherein the one or more TA values include a UE-specific TA value, and wherein a reference timing of the UE-specific TA value is for: a first propagation delay on a service link between the UE and a satellite associated with the NTN, and a second propagation delay on the service link.

In some implementations, an apparatus for wireless communication at a UE includes a memory and one or more processors coupled to the memory. The one or more processors may be configured to receive, from a serving node of an NTN, a first set of one or more TA values. The one or more processors may be configured to transmit, to the serving node of the NTN, uplink signaling based at least in part on a reference timing for the uplink signaling, wherein the reference timing for the uplink signaling is based at least in part on a reference timing of a downlink signaling, the first set of one or more TA values, and a second set of one or more TA values.

In some implementations, an apparatus for wireless communication at a serving node includes a memory and one or more processors coupled to the memory. The one or more processors may be configured to transmit, to a UE associated with an NTN, a first set of one or more TA values. The one or more processors may be configured to receive, from the UE, an uplink signaling in accordance with a reference timing for the uplink signaling based at least in part on a reference timing of a downlink signaling, the first set of one or more TA values, and a second set of one or more TA values.

In some implementations, a method of wireless communication performed by a UE includes receiving, from a serving node of an NTN, a first set of one or more TA values. The method includes transmitting, to the serving node of the NTN, uplink signaling based at least in part on a reference timing for the uplink signaling, wherein the reference timing for the uplink signaling is based at least in part on a reference timing of a downlink signaling, the first set of one or more TA values, and a second set of one or more TA values.

In some implementations, a method of wireless communication performed by a serving node includes transmitting, to a UE associated with an NTN, a first set of one or more TA values. The method includes receiving, from the UE, an uplink signaling in accordance with a reference timing for the uplink signaling based at least in part on a reference timing of a downlink signaling, the first set of one or more TA values, and a second set of one or more TA values.

In some implementations, a non-transitory computer-readable medium storing a set of instructions for wireless communication includes one or more instructions that, when executed by one or more processors of a UE, cause the UE to receive, from a serving node of an NTN, a first set of one or more TA values. The one or more instructions, when executed by the one or more processors of the UE, cause the UE to transmit, to the serving node of the NTN, uplink signaling based at least in part on a reference timing for the uplink signaling, wherein the reference timing for the uplink signaling is based at least in part on a reference timing of a downlink signaling, the first set of one or more TA values, and a second set of one or more TA values.

In some implementations, a non-transitory computer-readable medium storing a set of instructions for wireless communication includes one or more instructions that, when executed by one or more processors of a serving node, cause the serving node to transmit, to a UE associated with an NTN, a first set of one or more TA values. The one or more instructions, when executed by the one or more processors of the serving node, cause the serving node to receive, from the UE, an uplink signaling in accordance with a reference timing for the uplink signaling based at least in part on a reference timing of a downlink signaling, the first set of one or more TA values, and a second set of one or more TA values.

In some implementations, an apparatus for wireless communication includes means for receiving, from a serving node of an NTN, a first set of one or more TA values. The apparatus includes means for transmitting, to the serving node of the NTN, uplink signaling based at least in part on a reference timing for the uplink signaling, wherein the reference timing for the uplink signaling is based at least in part on a reference timing of a downlink signaling, the first set of one or more TA values, and a second set of one or more TA values.

In some implementations, an apparatus for wireless communication includes means for transmitting, to a UE associated with an NTN, a first set of one or more TA values. The apparatus includes means for receiving, from the UE, an uplink signaling in accordance with a reference timing for the uplink signaling based at least in part on a reference timing of a downlink signaling, the first set of one or more TA values, and a second set of one or more TA values.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
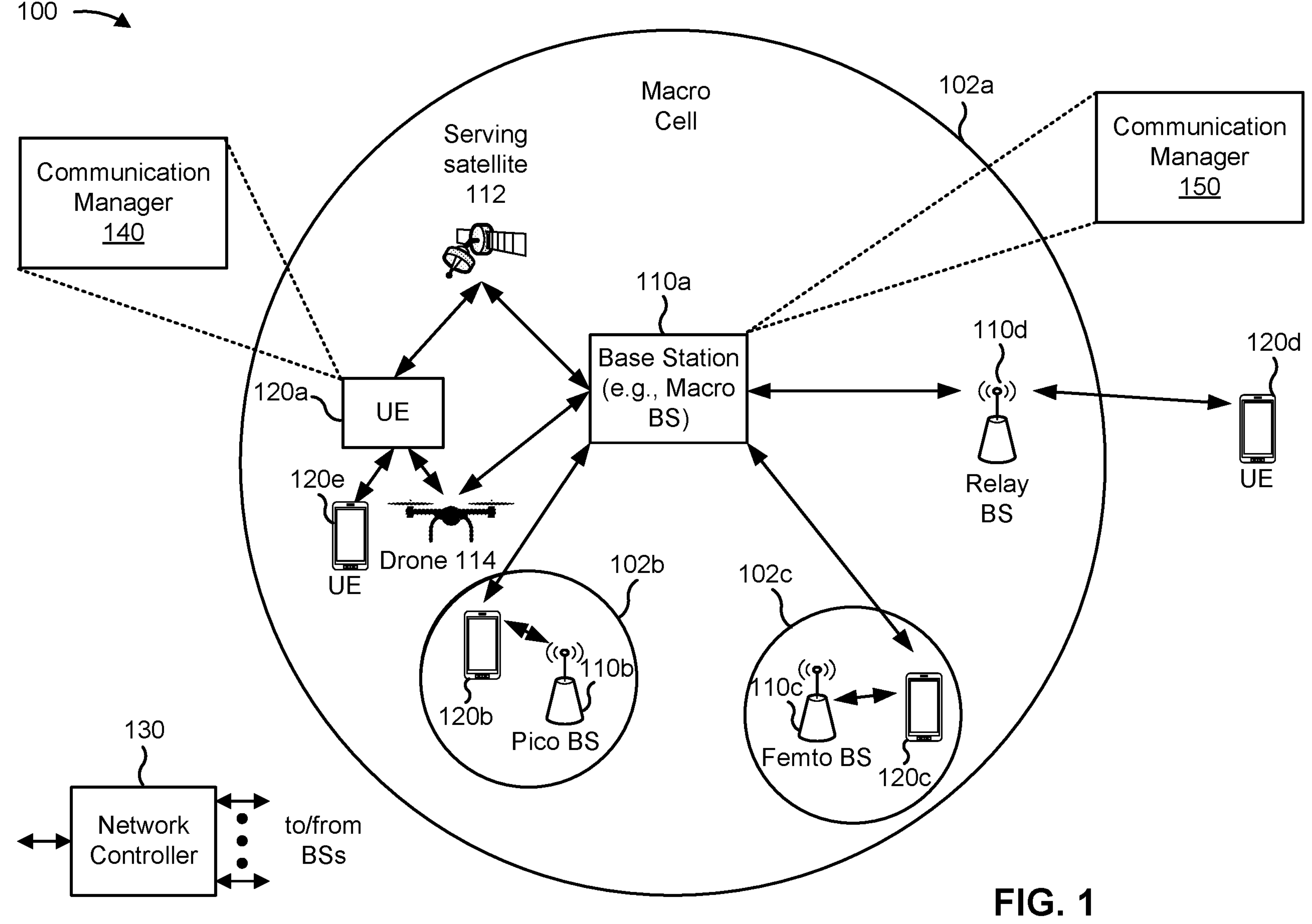
FIG. 1 is a diagram illustrating an example of a wireless network, in accordance with the present disclosure.

In a non-terrestrial network (NTN), a user equipment (UE) may communicate with a serving node (e.g., a base station) via a satellite. The satellite may relay downlink communications from the serving node to the UE, and the satellite may relay uplink communications from the UE to the serving node.

The serving node may use a timing advance (TA) to control an uplink transmission timing of a UE, which may ensure that uplink transmissions from a plurality of UEs are synchronized when received by the serving node. The TA may be a negative offset, at the UE, between a start of a received downlink subframe and a transmitted uplink subframe, where such an offset at the UE may be used to ensure that downlink and uplink subframes are synchronized at the serving node. A UE closer to the serving node may have a shorter propagation delay and thus a smaller TA, whereas a UE further away from the serving node may have a longer propagation delay and thus a larger TA.

In the NTN, as opposed to a terrestrial network, a frame boundary of a downlink slot may keep changing over time due to a satellite mobility, since the satellite mobility may affect propagation delays for the UE. Depending on the propagation delay between the UE and the serving node, which may depend on the mobility of the satellite associated with the serving node, the frame boundary of the downlink slot may change. In other words, the propagation delay at the UE may not be fixed. In the terrestrial network, unlike in the NTN, a frame boundary of a downlink slot may not keep changing over time due to a lack of base station mobility, such that propagation delays for the UE may not be affected.

In various aspects of techniques and apparatuses described herein, a UE may define a reference timing of an uplink signaling. The reference timing of the uplink signaling may be based at least in part on a propagation delay between the UE and a serving node. The propagation delay may consider a model of satellite mobility, where the model may be associated with a mobility of a satellite associated with the serving node. The UE may determine the reference timing for the uplink signaling based at least in part on a reference timing of a downlink signaling and a plurality of TA values, which may include a common TA value and/or a UE-specific TA value, where the UE-specific TA value may be based at least in part on ephemeris information. In one or more examples, at least some of the TA values may be based at least in part on the satellite mobility. In other words, at least some of the TA values may be based at least in part on satellite movement. The UE may transmit, to the serving node of the NTN, the uplink signaling based at least in part on the reference timing of the uplink signaling. The UE may transmit the uplink signaling using the reference timing of the uplink signaling, which may account for changes to a downlink slot or frame boundary over time due to the satellite mobility. The UE, by using the reference timing of the uplink signaling, may be able to perform the uplink signaling without having to predict the frame boundary of the downlink slot, which would be more susceptible to UE error and more likely to result in an uplink transmission that suffers from uplink transmission timing inaccuracy. The reference timing of the uplink signaling may improve the uplink transmission timing accuracy because the reference timing of the uplink signaling may be based at least in part on the propagation delay, thereby improving an overall system performance.

Aspects described herein may be applied to a moving cell deployment when cell mobility information with respect to the UE may be made known to the UE, such as in an NTN. The NTN may utilize one or more satellites or drones. The NTN may be based at least in part on a balloon type network or an unmanned aircraft network.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a UE 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some aspects, the terms "base station" (e.g., the base station 110) or "network node" may refer to an aggregated base station, a disaggregated base station, an integrated access and backhaul (IAB) node, a relay node, and/or one or more components thereof. For example, in some aspects, "base station" or "network node" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the base station 110. In some aspects, the terms "base station" or "network node" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations and/or one or more virtual base station functions. For example, in some aspects, two or more base station functions may be instantiated on a single device. In some aspects, the terms "base station" or "network node" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

The electromagnetic spectrum is often subdivided, by frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a “Sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term “sub-6 GHz” or the like, if used herein, may broadly represent frequencies that may be less than 6 GHz, may be within FR1, or may include mid-band frequencies. Further, unless specifically stated otherwise, it should be understood that the term “millimeter wave” or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a serving node of an NTN, one or more TA values; and transmit, to the serving node of the NTN, uplink signaling based at least in part on a reference timing for the uplink signaling, wherein the reference timing for the uplink signaling is based at least in part on a reference timing of a downlink signaling and the one or more TA values, wherein the one or more TA values include a UE-specific TA value, and wherein a reference timing of the UE-specific TA value is for: a first propagation delay on a service link between the UE and a satellite associated with the NTN, and a second propagation delay on the service link. Additionally, or alternatively, the communication manager 140 may perform one or more other operations described herein.

In some aspects, a serving node (e.g., base station 110) may include a communication manager 150. As described in more detail elsewhere herein, the communication manager 150 may output one or more TA values; and obtain uplink signaling based at least in part on a reference timing for the uplink signaling, wherein the reference timing for the uplink signaling is based at least in part on a reference timing of a downlink signaling and the one or more TA values, wherein the one or more TA values include a UE-specific TA value, and wherein a reference timing of the UE-specific TA value is for: a first propagation delay on a service link between the UE and a satellite associated with the NTN, and a second propagation delay on the service link. Additionally, or alternatively, the communication manager 150 may perform one or more other operations described herein.

As indicated above, FIG. 1 is provided as an example. Other examples may differ from what is described with regard to FIG. 1.

Figure 2:
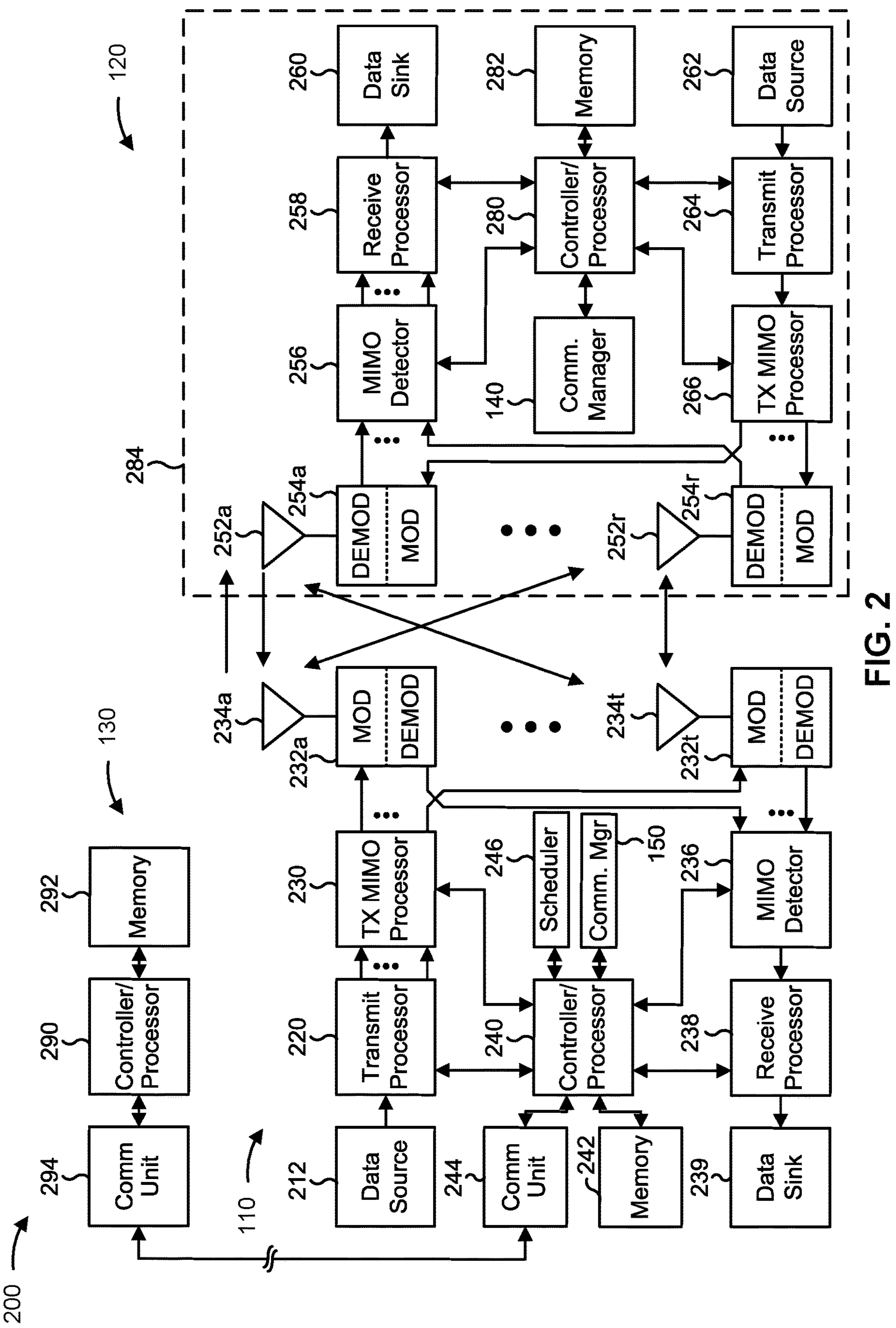
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor (RX) 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with a reference timing for an uplink transmission in an NTN, as described in more detail elsewhere herein. In some aspects, the serving node described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a serving node associated with an NTN, one or more TA values; and/or means for transmitting, to the serving node of the NTN, uplink signaling based at least in part on a reference timing for the uplink signaling, wherein the reference timing for the uplink signaling is based at least in part on a reference timing of a downlink signaling and the one or more TA values, wherein the one or more TA values include a UE-specific TA value, and wherein a reference timing of the UE-specific TA value is for: a first propagation delay on a service link between the UE and a satellite associated with the NTN, and a second propagation delay on the service link. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a serving node (e.g., base station 110) includes means for outputting one or more TA values; and/or means for obtaining uplink signaling based at least in part on a reference timing for the uplink signaling, wherein the reference timing for the uplink signaling is based at least in part on a reference timing of a downlink signaling and the one or more TA values, wherein the one or more TA values include a UE-specific TA value, and wherein a reference timing of the UE-specific TA value is for: a first propagation delay on a service link between the UE and a satellite associated with the NTN, and a second propagation delay on the service link. In some aspects, the means for the serving node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
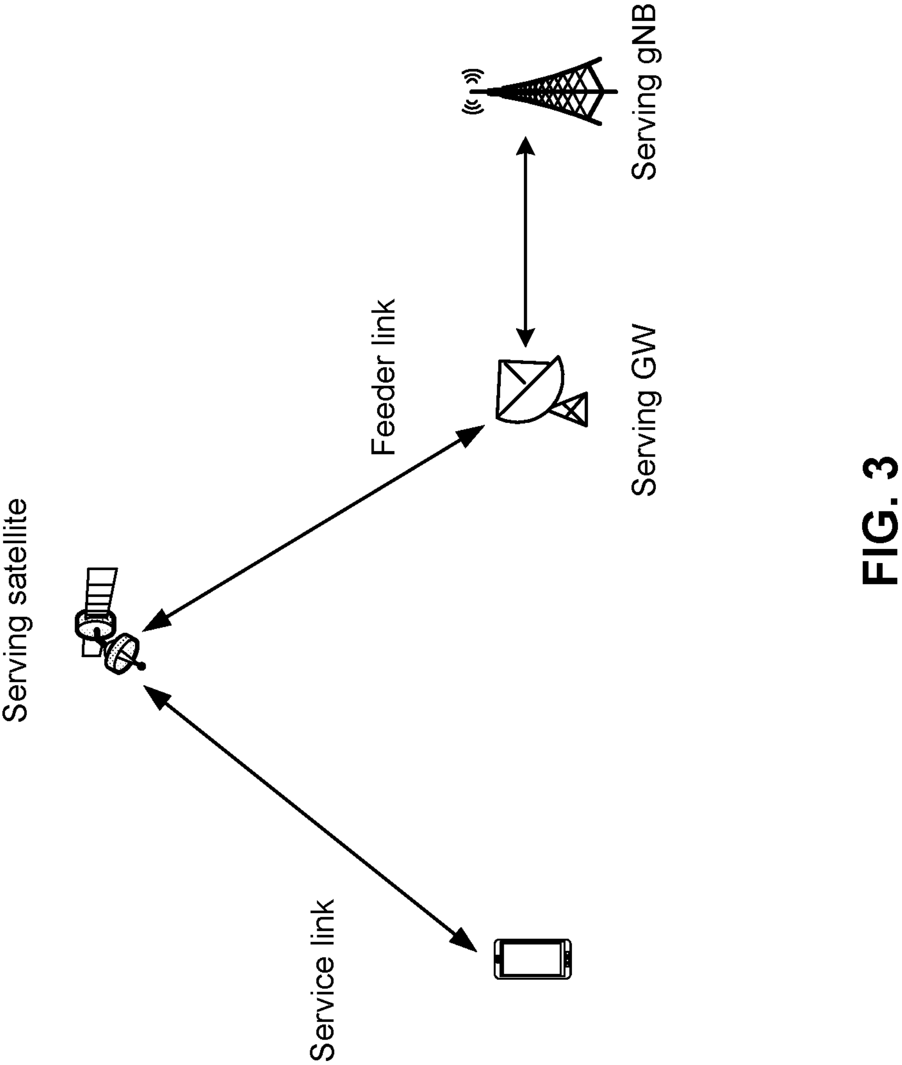
FIG. 3 is a diagram illustrating an example of a non-terrestrial network (NTN), in accordance with the present disclosure.

FIG. 3 is a diagram illustrating an example 300 of an NTN, in accordance with the present disclosure.

As shown in FIG. 3, a UE may communicate with a serving gNB via a serving satellite in the NTN. The UE may transmit an uplink transmission to the serving satellite. The serving satellite may relay the uplink transmission to the serving gNB via a serving gateway. The serving gNB may transmit a downlink transmission to the serving satellite via the serving gateway. The serving satellite may relay the downlink transmission to the UE. A link between the UE and the serving satellite may be a service link, and a link between the serving satellite and the serving gateway may be feeder link.

As indicated above, FIG. 3 is provided as an example. Other examples may differ from what is described with regard to FIG. 3.

Figure 4:
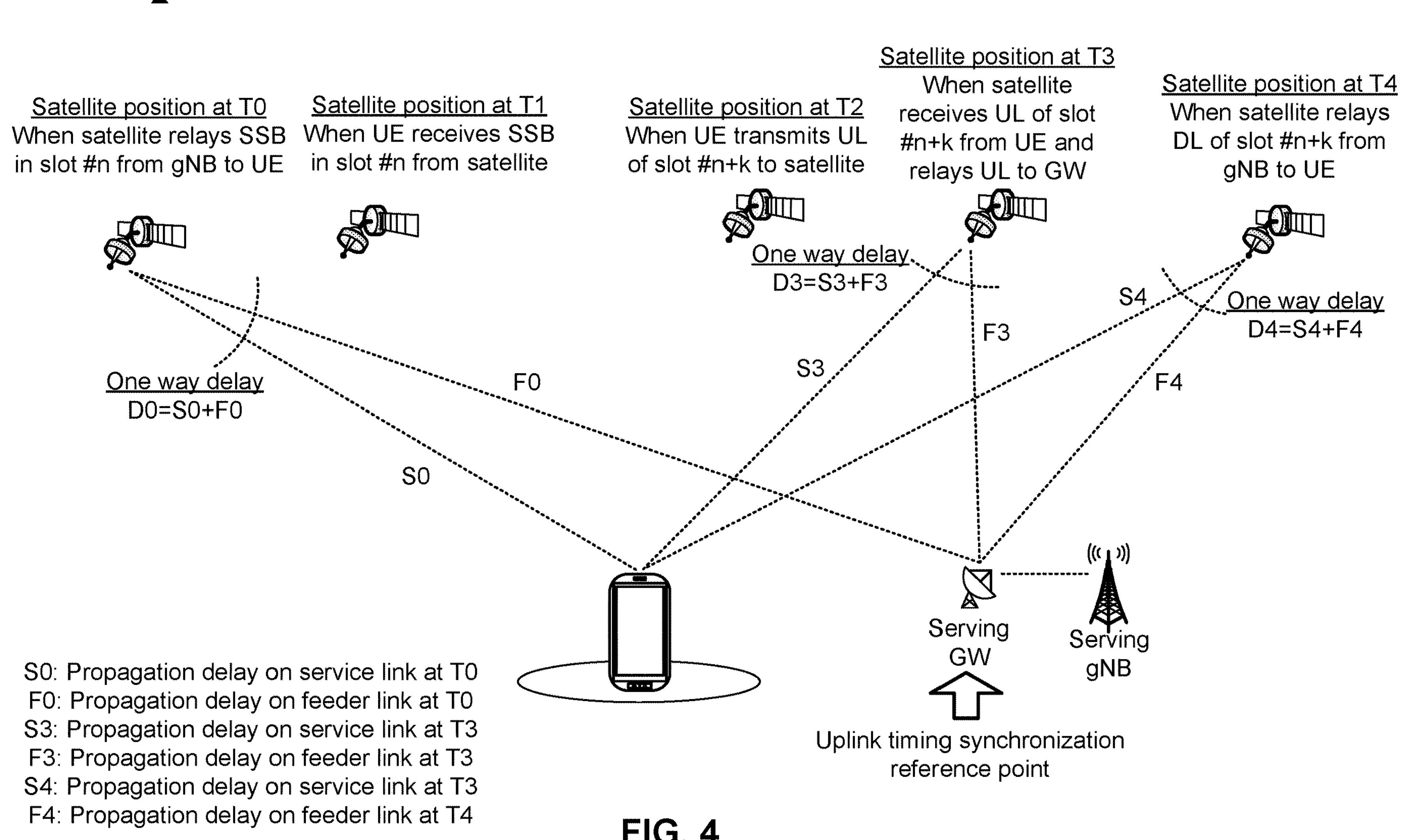
FIG. 4 is a diagram illustrating an example of a reference system model of an NTN timing relation, in accordance with the present disclosure.

FIG. 4 is a diagram illustrating an example 400 of a reference system model of an NTN timing relation, in accordance with the present disclosure.

As shown in FIG. 4, a UE may communicate with a serving node (e.g., serving gNB) via a satellite (e.g., a serving satellite) and a serving gateway. The serving gateway may be associated with an uplink timing synchronization reference point. With respect to the reference system model of the NTN timing, the satellite may be at a first position at time T0 when the satellite relays a synchronization signal block (SSB) in slot #n from the serving node to the UE. S0 may indicate a propagation delay on a service link between the UE and the satellite at T0, and F0 may indicate a propagation delay on a feeder link between the serving gateway and the satellite at T0. A one-way delay (D0) associated with the SSB may equal S0 plus F0. The satellite may be at a second position at time T1 when the UE receives the SSB in slot #n from the satellite. The satellite may be at a third position at time T2 when the UE transmits an uplink signal of slot #n+k to the satellite. S3 may indicate a propagation delay on the service link at T3. The satellite may be at a fourth position at time T3 when the satellite receives the uplink signal of slot #n+k from the UE and relays the uplink signal to the serving gateway. F3 may indicate a propagation delay on the feeder link at T3. A one-way delay (D3) associated with the uplink signal may be S3 plus F3. The satellite may be at a fifth position at time T4 when the satellite relays a downlink signal of slot #n+k from the serving node to the UE. S4 may indicate a propagation delay on the service link at T4, and F4 may indicate a propagation delay on the feeder link at T4. A one-way delay (D4) associated with the downlink signal may be S4 plus F4.

As indicated above, FIG. 4 is provided as an example. Other examples may differ from what is described with regard to FIG. 4.

In a terrestrial network, a TA may be used to control an uplink transmission timing of a UE, which may ensure that uplink transmissions from a plurality of UEs are synchronized when received by a serving node (e.g., a base station). The TA may be a negative offset, at the UE, between a start of a received downlink subframe and a transmitted uplink subframe, where such an offset at the UE may be used to ensure that downlink and uplink subframes are synchronized at the serving node. A UE closer to the serving node may have a shorter propagation delay and thus a smaller TA, whereas a UE further away from the serving node may have a longer propagation delay and thus a larger TA. The TA may account for a round-trip propagation delay. At the UE, a reference point for a UE initial transmit timing requirement may be a downlink timing of a reference cell minus ($N_{TA}$+$N_{TA,offset}$*$T_c$), where $N_{TA}$ is a measured value, $N_{TA,offset}$ is a fixed value depending on a frequency band and a subcarrier spacing, and $T_c$ is a basic time unit (e.g., for a 5G NR system). In other words, an uplink frame number i for an uplink transmission from the UE may start at $T_{TA}=(N_{TA}+N_{TA,offset})*T_c$, where $T_{TA}$ refers to the TA. The downlink timing of the reference cell may be defined as the time when a first detected path (in time) of a corresponding downlink frame is received from the reference cell.

In an NTN, as opposed to a terrestrial network, a frame boundary may keep changing over time due to satellite mobility, unless a UE is being served by a geostationary satellite of the NTN. A geostationary satellite may have a higher altitude as compared to a non-geostationary satellite, such as a low Earth orbit (LEO) satellite or a medium Earth orbit (MEO) satellite, and thus a lower relative speed with respect to Earth, which may result in a more constant frame boundary. In other words, from the UE perspective, the geostationary satellite may have less mobility as compared to the non-geostationary satellite, and thus the frame boundary may not keep changing over time.

For example, a geostationary satellite may have an altitude of 36,000 kilometers, whereas a non-geostationary satellite may have an altitude of 600 kilometers. Since a relative satellite speed from the UE perspective may be based at least in part on an altitude of a satellite and an elevation angle between the UE and the satellite, the geostationary satellite may have a lower relative speed as compared to the non-geostationary satellite.

In the NTN, when the frame boundary keeps changing over time, the UE may need to predict a downlink slot/frame boundary based at least in part on a UE location and NTN assistance information. The NTN assistance information may include satellite ephemeris information and/or feeder link time-drift information. The UE may predict the downlink slot/frame boundary before transmitting uplink signals/channels.

In order to define UE requirements on an uplink transmission timing accuracy, a specific reference timing of a propagation delay derivation may be defined, as the propagation delay timing may not be fixed and may change an error measurement. Further, the propagation delay derivation may be defined based at least in part on a model of the satellite mobility. The satellite mobility may impact the specific reference timing of the propagation delay derivation and, therefore, the UE requirements on the uplink transmission timing accuracy.

Figure 5:
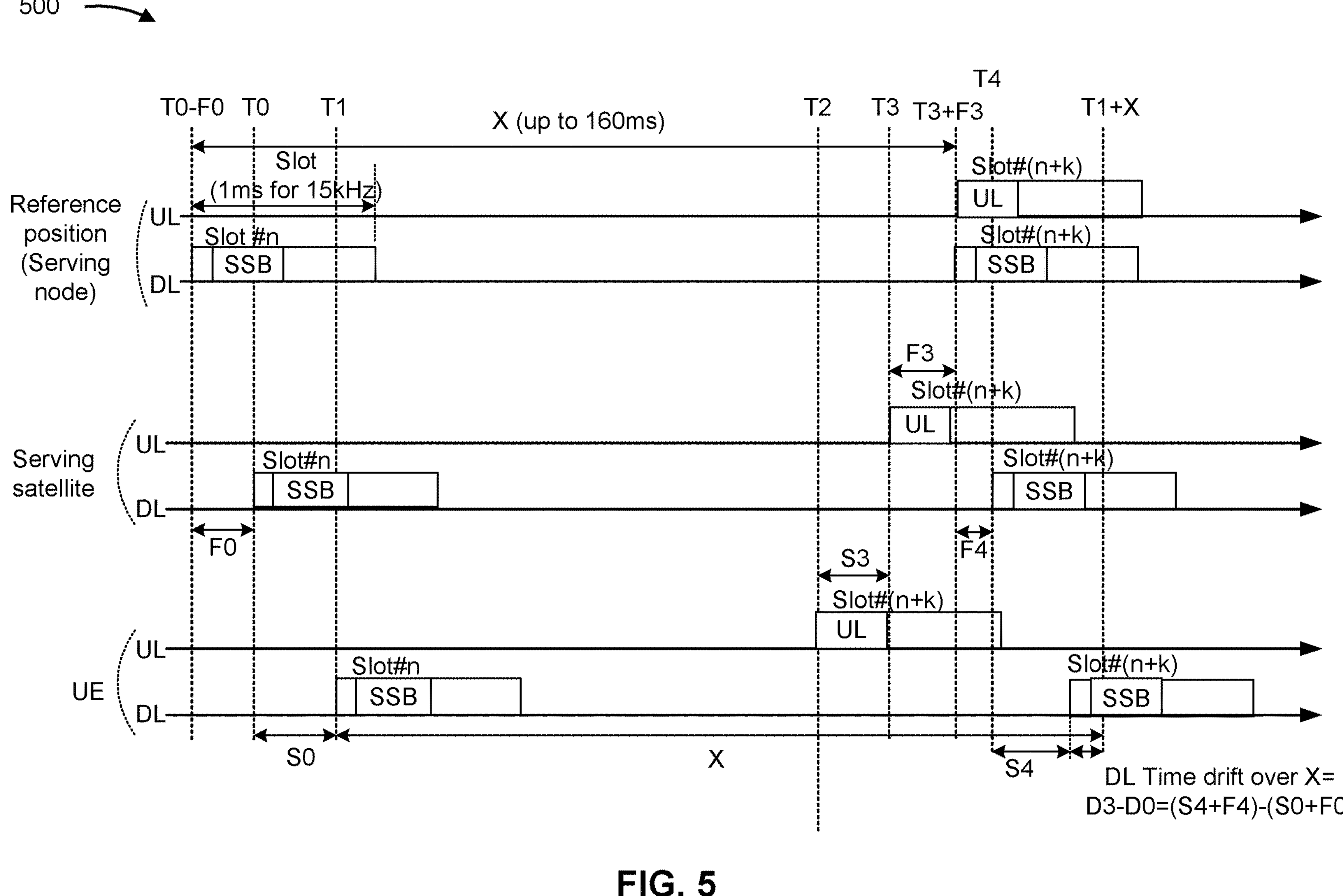
FIG. 5 is a diagram illustrating an example 500 of a timing relation between a UE downlink reception and a UE uplink transmission, in accordance with the present disclosure.

FIG. 5 is a diagram illustrating an example 500 of a timing relation between a UE downlink reception and a UE uplink transmission, in accordance with the present disclosure.

As shown in FIG. 5, a serving node may transmit slot #n at time T0-F0 in a downlink. The slot #n may include an SSB. The serving node may be associated with a reference position. A serving satellite may relay (e.g., receive and transmit) slot #n with the SSB at T0, due to a propagation delay (F0) on a feeder link between the serving node and the serving satellite. A UE may receive slot #n with the SSB at T1, due to a propagation delay (S0) on a service link between the serving satellite and the UE. The UE may transmit slot #n+k at time T2 in an uplink. The slot #n+k may include an uplink signal. The serving satellite may relay (e.g., receive and transmit) slot #n+k with the uplink signal at T3, due to a propagation delay (S3) on the service link. The serving node may receive slot #n+k with the uplink signal at time T3+F3, due to a propagation delay (F3) on the feeder link.

The serving node may transmit, in slot #n+k, a downlink signal (e.g., another SSB) in a downlink. The slot #n+k may be associated with both the uplink signal and the downlink signal. The serving satellite may relay (e.g., receive and transmit) slot #n+k with the downlink signal at T4, due to a propagation delay (F4) on the feeder link. The UE may receive slot #n+k with the downlink signal at a certain time T1+X, due to a propagation delay (S4) on the service link. Further, X may correspond to a time duration between T0−F0 and T3+F3, where X may be up to 160 ms. An SSB may or may not be included in slot #n+k. When X equals 160 ms, the SSB may be included in slot #n+k.

For an uplink procedure for an uplink transmission, a downlink synchronization may be based at least in part on reference signals, such as an SSB or a tracking reference signal (TRS). The UE may determine T1. The UE may project a downlink arrival time associated with an uplink in terms of a frame boundary at a reference point by determining (T1+X+downlink time drift over X). The UE may apply a round trip delay by determining a difference between (T1+X+downlink time drift over X) and (S3+F3)−(S4+F4). The downlink time drift over X is equal to D3−D0 (as shown in FIG. 4), which is equal to (S4+F4)−(S0−F0).

A reference position of the serving satellite to define an uplink reference timing may be T3 when defining S3 and F3. A reference position of the serving satellite to define the uplink reference timing may be T4 when defining S4 and F4. Further, with respect to propagation delays over service and feeder links, S3 and S4 may not be identical and F3 and F4 may not be identical.

A start of slot #n+k, from a perspective of the UE, may be at T2. T2 is equal to T1+X+DL Time drift over X−(S3+F3)−(S4+F4), which is equal to T1+X+(S4−S0+F4−F0)−(S3+S4+F3+F4), which is equal to T1+X−(S0+F0)−(S3+F3), which is equal to T1+X−DL/UL Time drift over X.

As indicated above, FIG. 5 is provided as an example. Other examples may differ from what is described with regard to FIG. 5.

Figure 6A:
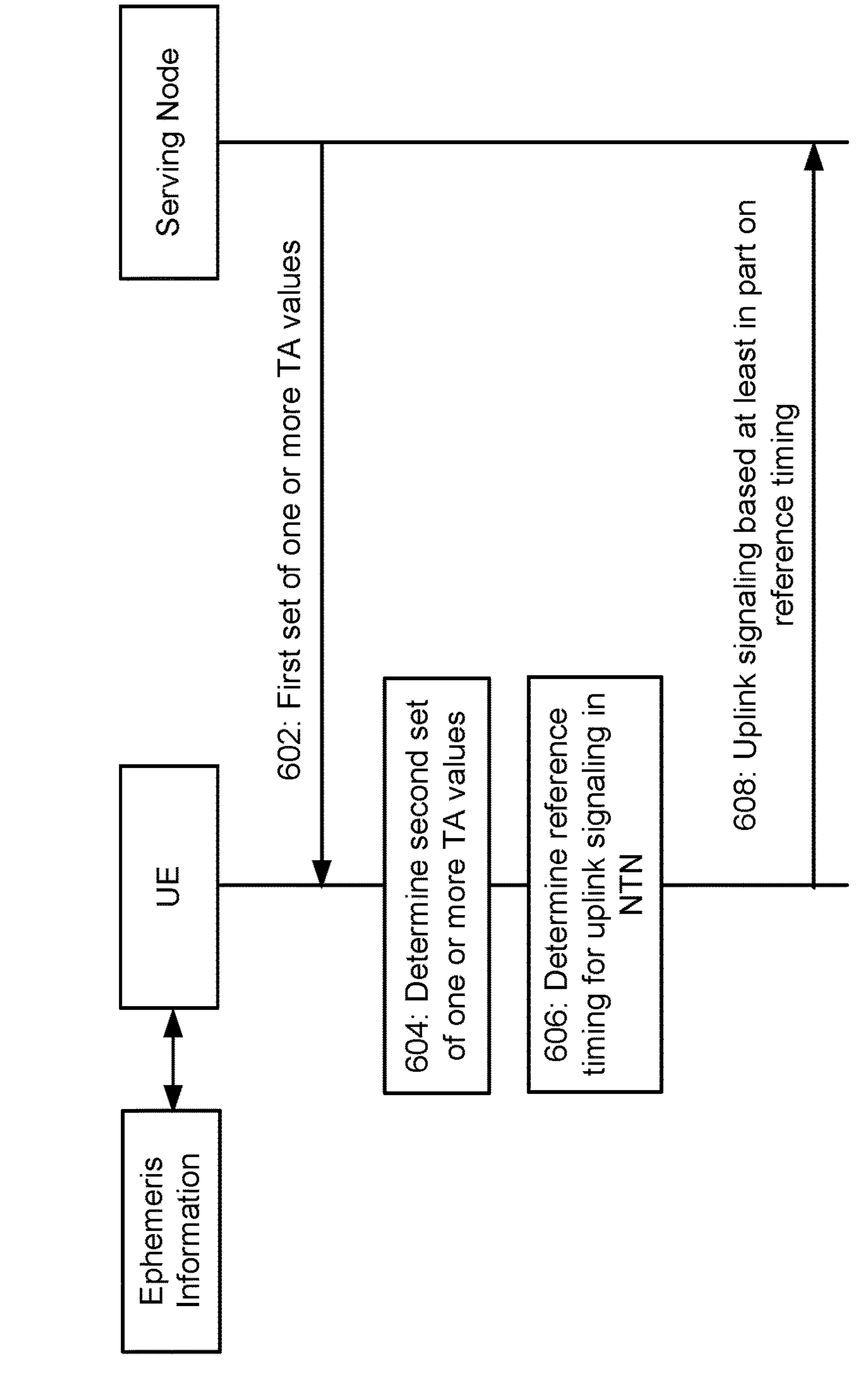
FIGS. 6A and 6B are diagrams illustrating examples associated with reference timings for uplink signaling in an NTN, in accordance with the present disclosure.
Figure 6B:
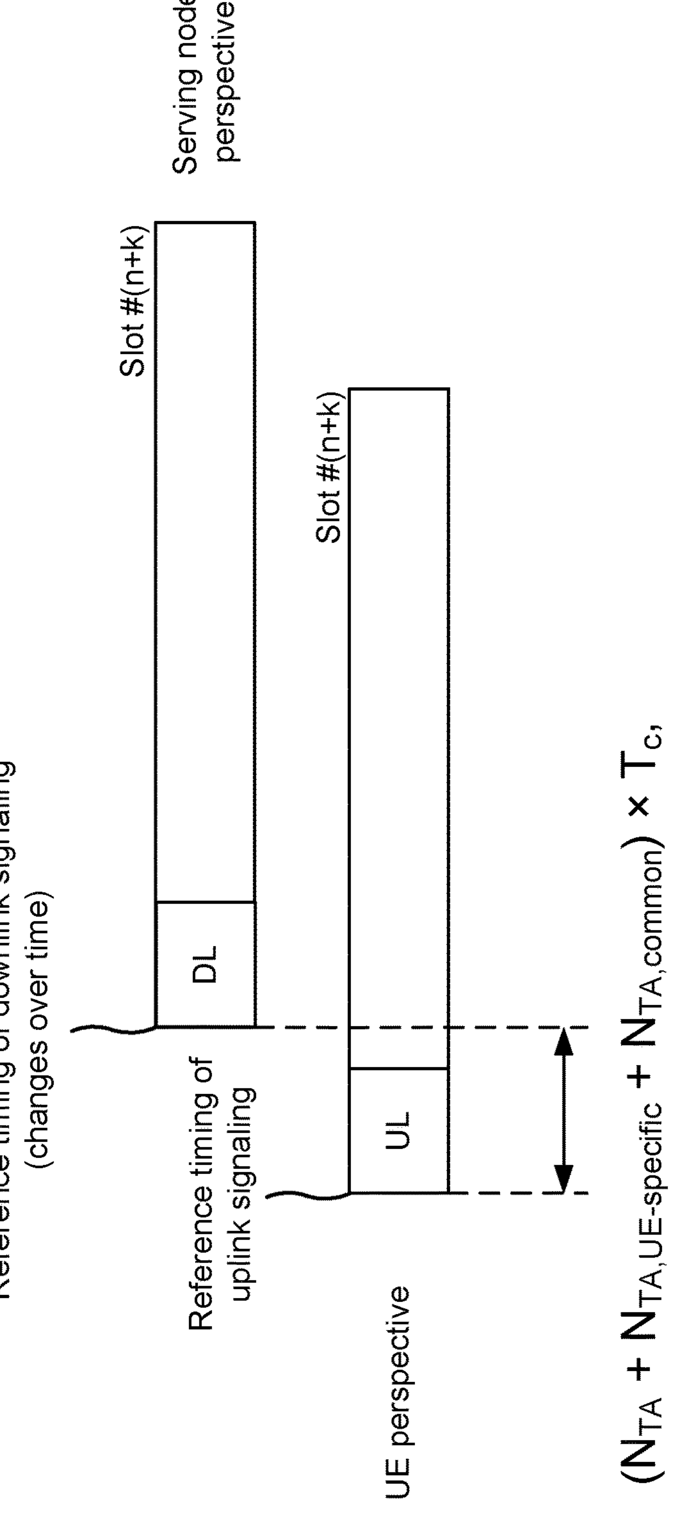

FIGS. 6A and 6B are diagrams illustrating examples 600, 610 associated with reference timings for uplink signaling in an NTN, in accordance with the present disclosure. As shown in FIG. 6A, example 600 includes communication between a UE (e.g., UE 120) and a serving node (e.g., base station 110) via a satellite (e.g., serving satellite 112) or drone 114. In some aspects, the UE and the serving node may be included in a wireless network, such as wireless network 100.

In some aspects, the UE may obtain ephemeris information. The UE may be preconfigured with the ephemeris information, and/or the UE may receive the ephemeris information via signaling from the serving node.

As shown in FIG. 6A and by reference number 602, the UE may receive, from the serving node, which may be associated with a serving cell, a first set of TA values. In other words, the first set of TA values may be signaled by the serving node to the UE. The first set of TA values may indicate one or more TA values.

As shown by reference number 604, the UE may determine a second set of TA values. The second set of TA values, as determined at the UE, may be different from the first set of TA values, as received from the serving node. The second set of TA values may indicate one or more TA values.

In some aspects, the first set of TA values or the second set of TA values may include a TA value ($N_{TA}$), a UE-specific TA value ($N_{TA,UE\text{-}specific}$), a common TA value ($N_{TA,common}$), and/or a TA offset value ($N_{TA,offset}$). In other words, some TA values (e.g., $N_{TA,UE\text{-}specific}$ and $N_{TA,common}$) may be estimated by the UE, while other TA values (e.g., $N_{TA}$ and/or $N_{TA,offset}$) may be indicated by the serving node. $N_{TA}$ is a measured value, $N_{TA,offset}$ is a fixed value depending on a frequency band and a subcarrier spacing, and $T_c$ is a basic time unit (e.g., for a 5G NR system). $N_{TA,UE\text{-}specific}$ and $N_{TA}$,common may be values that are specific to the UE and the NTN associated with the UE.

As shown by reference number 606, the UE may determine a reference timing for an uplink transmission in the NTN based at least in part on a reference timing of a downlink transmission, the first set of TA values, and the second set of TA values. The reference timing of the downlink may be a downlink slot corresponding to an uplink slot index in which the UE transmits the uplink transmission (e.g., DL slot #(n+k) at UE perspective shown in FIG. 5). In some aspects, the reference timing for the uplink transmission may be the reference timing of the downlink minus a total of the first set of TA values and the second set of TA values multiplied by a basic time unit ($T_c$) for an NR system. In other words, the reference timing for an uplink transmission timing requirement may be the reference timing of the downlink (e.g., a downlink timing of a reference cell) minus $(N_{TA}+N_{TA,UE\text{-}specific}+N_{TA,common})\times T_c$, where the reference timing of the downlink may be the downlink slot corresponding to the uplink slot in which the UE transmits an uplink signal/channel.

In some aspects, a reference timing of the UE-specific TA value may be for a first propagation delay (S3) on a service link between the UE and a satellite associated with the NTN at a time in which the satellite receives the uplink transmission from the UE and relays the uplink transmission to the serving node, or the reference timing of the UE-specific TA value may be for a second propagation delay (S4) on the service link at a time in which the satellite relays a downlink transmission from the serving node to the UE. S3 and S4 are shown in FIGS. 4 and 5.

In some aspects, the reference timing of the UE-specific TA value may be, for the first propagation delay, a slot in which the uplink transmission is expected to arrive at the satellite based at least in part on a true satellite position of the satellite. The true satellite position of the satellite may correspond to an actual position of the satellite at a given time. In other words, the reference timing of the UE-specific TA value may be, for S3, the slot when the uplink transmission is supposed to arrive at a target satellite based at least in part on the true satellite position (corresponds to T3 in FIGS. 4 and 5).

In some aspects, the reference timing of the UE-specific TA value may be, for the second propagation delay, a slot in which the downlink transmission corresponding to the reference timing of the downlink is expected to arrive at the satellite based at least in part on a true satellite position of the satellite and an actual received time of the slot. In other words, the reference timing of the UE-specific TA value may be, for S4, the slot when the downlink transmission corresponding to the reference timing of the downlink is supposed to arrive at a target satellite based at least in part on the true satellite position and the actual received time of the slot (corresponds to T4 in FIGS. 4 and 5).

In some aspects, an inaccuracy in ephemeris information provided by the serving node may not be part of a UE requirement. The reference timing of the UE-specific TA value may be, for the first propagation delay, a slot in which the uplink transmission is expected to arrive at the satellite based at least in part on validated ephemeris information and a true satellite position of the satellite. In other words, the reference timing of the UE-specific TA value may be, for S3, the slot when the uplink transmission is supposed to arrive at a target satellite based at least in part on provided valid ephemeris information and the true satellite position (corresponds to T3 in FIGS. 4 and 5). The provided valid ephemeris information may have no error except for quantization. The provided valid ephemeris information may be ephemeris information received within a validity duration. The ephemeris information may provide a table that indicates calculated positions of the target satellite at periodic intervals.

In some aspects, the reference timing of the UE-specific TA value may be, for the second propagation delay, a slot in which the downlink transmission corresponding to the reference timing of the downlink is expected to arrive at the satellite based at least in part on: an actual received time of the slot, validated ephemeris information with no error except for quantization, and/or a UE propagation model with increased accuracy as compared to a reference orbit propagation model. In other words, the reference timing of the UE-specific TA value may be, for S4, the slot when the downlink transmission corresponding to the reference timing of the downlink is supposed to arrive at a target satellite based at least in part on the actual received time of the slot, provided valid ephemeris information (with no error except for quantization), and/or a propagation model more accurate than the reference orbit propagation model (e.g., a symmetric gravitational model) (refers to T4 in FIGS. 4 and 5). The propagation model may indicate a predicted propagation of signals between the UE and the satellite over a period of time, where the predicted propagation may be based at least in part on a mobility of the satellite, a frequency of the signals, a distance between the UE and the satellite, and other conditions.

In some aspects, an inaccuracy in ephemeris information provided by the serving node may not be part of a UE requirement. The reference timing of the UE-specific TA value may be, for the first propagation delay, a slot in which the uplink transmission is expected to arrive at the satellite based at least in part on validated ephemeris information and a UE propagation model with increased accuracy as compared to a reference orbit propagation model. In other words, the reference timing of the UE-specific TA value may be, for S3, the slot when the uplink transmission is supposed to arrive at a target satellite based at least in part on provided valid ephemeris information and a propagation model more accurate than the reference orbit propagation model. No error in the provided valid ephemeris information may account for UE error.

In some aspects, the reference timing of the UE-specific TA value may be, for the second propagation delay, a slot in which the downlink transmission corresponding to the reference timing of the downlink is expected to arrive at the satellite based at least in part on: an actual received time of the slot, validated ephemeris information for which no error accounts for UE error, and a UE propagation model with increased accuracy as compared to a reference orbit propagation model. In other words, the reference timing of the UE-specific TA value may be, for S4, the slot when the downlink transmission corresponding to the reference timing of the downlink is supposed to arrive at a target satellite based at least in part on the actual received time of the slot, provided valid ephemeris information (with no error accounting for UE error), and a propagation model more accurate than the reference propagation model.

In some aspects, an independent/separate UE requirement on the propagation model may be specified. The requirement on the UE propagation model may be more accurate than the reference propagation model (e.g., the symmetric gravitational model).

In some aspects, a reference timing of the common TA value may be for a first propagation delay (F3) on a feeder link between the satellite associated with the NTN and a serving gateway associated with the serving node at a time in which the satellite receives the uplink transmission from the UE and relays the uplink transmission to the serving node, or the reference timing of the common TA value may be for a second propagation delay (F4) on the feeder link at a time in which the satellite relays a downlink transmission from the serving node to the UE. F3 and F4 are shown in FIGS. 4 and 5. The reference timing of the common TA value may be based at least in part on related parameters broadcast within a validity duration. In other words, the reference timing of the common TA value, which may correspond to F3+F4, may be derived according to $N_{TA,common}$ related parameters broadcasted within the validity duration.

As shown by reference number 608, the UE may transmit, to the serving node, the uplink transmission based at least in part on the reference timing for the uplink transmission in the NTN. The serving node may receive, from the UE, the uplink transmission in accordance with the reference timing for the uplink transmission that is based at least in part on the reference timing of the downlink, the first set of TA values, and the second set of TA values. In other words, the serving node may receive the uplink transmission in accordance with the reference timing for the uplink transmission, which may be based at least in part on the TA value, the UE-specific TA value, the common TA value, and/or the TA offset value.

In some aspects, the UE may receive, from the serving node, open-loop TA control related parameters. The UE may adjust a downlink frame boundary associated with the reference timing of the downlink based at least in part on the open-loop TA control related parameters. In other words, the downlink frame boundary may be adjusted according to the open-loop TA control related parameters provided by the serving cell.

As shown in FIG. 6B, a reference timing for an uplink signaling may be a reference timing of a downlink signaling minus a total of a first set of one or more TA values and a second set of one or more TA values multiplied by a basic time unit ($T_c$). The first set of one or more TA values or the second set of one or more TA values may include a TA value ($N_{TA}$), a UE-specific TA value ($N_{TA,UE\text{-}specific}$), a common TA value ($N_{TA,common}$), and/or a TA offset value ($N_{TA,offset}$). In other words, the reference timing for the uplink signaling may be the reference timing of the downlink signaling minus a total of $(N_{TA}+N_{TA,UE\text{-}specific}+N_{TA,common})\times T_c$. From a serving node perspective, the serving node may transmit downlink signaling in slot index #(n+k) based at least in part on the reference timing of the downlink signaling, which may change over time based at least in part on UE mobility. From a UE perspective, the UE may transmit uplink signaling in slot index #(n+k) based at least in part on the reference timing of the uplink signaling, where the reference timing of the uplink signaling may be based at least in part on the reference timing of the downlink signaling minus the total of $(N_{TA}+N_{TA,UE\text{-}specific}+N_{TA,common})\times T_c$.

As indicated above, FIGS. 6A and 6B are provided as examples. Other examples may differ from what is described with regard to FIGS. 6A and 6B.

Figure 7:
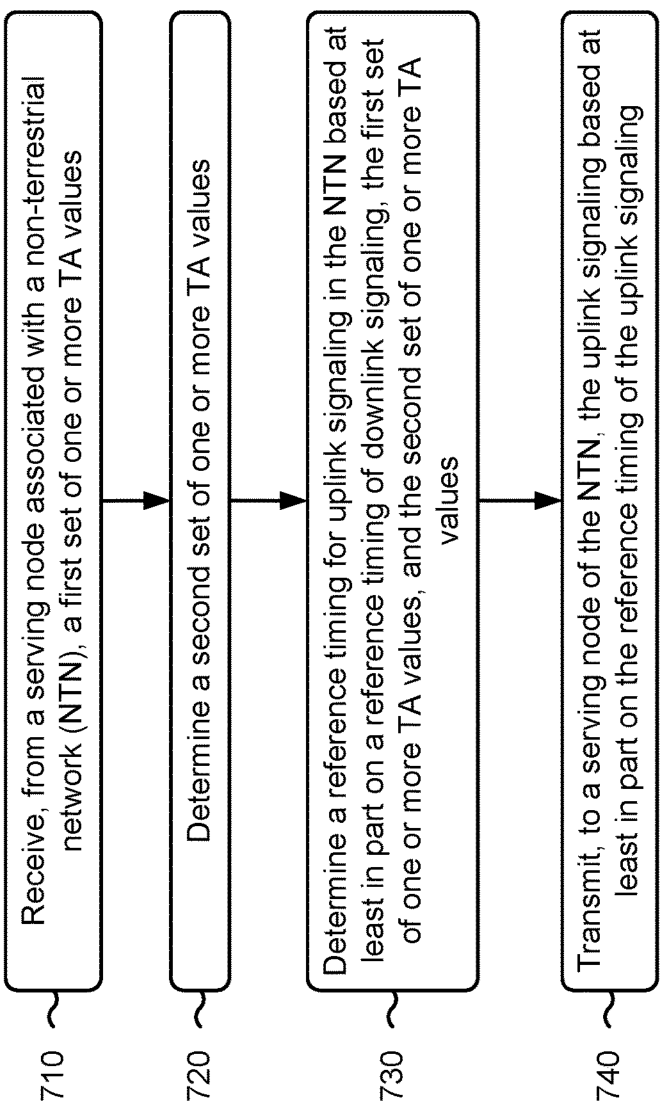
FIGS. 7-8 are diagrams illustrating example processes associated with a reference timing for an uplink transmission in an NTN, in accordance with the present disclosure.

FIG. 7 is a diagram illustrating an example process 700 performed, for example, by a UE, in accordance with the present disclosure. Example process 700 is an example where the UE (e.g., UE 120) performs operations associated with reference timing for an uplink transmission in an NTN.

As shown in FIG. 7, in some aspects, process 700 may include receiving, from a serving node associated with an NTN, a first set of one or more TA values (block 710). For example, the UE (e.g., using communication manager 140 and/or reception component 902, depicted in FIG. 9) may receive, from a serving node associated with an NTN, a first set of TA values, as described above.

As further shown in FIG. 7, in some aspects, process 700 may include determining a second set of one or more TA values (block 720). For example, the UE (e.g., using communication manager 140 and/or determination component 908, depicted in FIG. 9) may determine a second set of TA values, as described above.

As further shown in FIG. 7, in some aspects, process 700 may include determining a reference timing for uplink signaling in the NTN based at least in part on a reference timing of downlink signaling, the first set of one or more TA values, and the second set of one or more TA values (block 730). For example, the UE (e.g., using communication manager 140 and/or determination component 908, depicted in FIG. 9) may determine a reference timing for uplink signaling in the NTN based at least in part on a reference timing of downlink signaling, the first set of one or more TA values, and the second set of one or more TA values, as described above.

As further shown in FIG. 7, in some aspects, process 700 may include transmitting, to the serving node of the NTN, the uplink signaling based at least in part on the reference timing of the uplink signaling (block 740). For example, the UE (e.g., using communication manager 140 and/or transmission component 904, depicted in FIG. 9) may transmit, to the serving node of the NTN, the uplink signaling based at least in part on the reference timing of the uplink signaling, as described above.

Process 700 may include additional aspects, such as any single aspect or any combination of aspects described below and/or in connection with one or more other processes described elsewhere herein.

In a first aspect, the reference timing of the downlink signaling is a downlink slot corresponding to an uplink slot associated with the uplink signaling.

In a second aspect, alone or in combination with the first aspect, the reference timing for the uplink signaling is the reference timing of the downlink signaling minus a total of the first set of one or more TA values and the second set of one or more TA values multiplied by a basic time unit ($T_c$).

In a third aspect, alone or in combination with one or more of the first and second aspects, the first set of one or more TA values or the second set of one or more TA values include one or more of: a TA value ($N_{TA}$), a UE-specific TA value ($N_{TA,UE\text{-}specific}$), a common TA value ($N_{TA,common}$), or a TA offset value ($N_{TA,offset}$).

In a fourth aspect, alone or in combination with one or more of the first through third aspects, a reference timing of the UE-specific TA value is for: a first propagation delay on a service link between the UE and a satellite associated with the NTN, or a second propagation delay on the service link.

In a fifth aspect, alone or in combination with one or more of the first through fourth aspects, the reference timing of the UE-specific TA value is, for the first propagation delay, a slot in which the uplink signaling is expected to arrive at the satellite based at least in part on a true satellite position of the satellite.

In a sixth aspect, alone or in combination with one or more of the first through fifth aspects, the reference timing of the UE-specific TA value is, for the second propagation delay, a slot in which the downlink signaling corresponding to the reference timing of the downlink signaling is expected to arrive at the satellite based at least in part on a true satellite position of the satellite and an actual received time of the slot.

In a seventh aspect, alone or in combination with one or more of the first through sixth aspects, the reference timing of the UE-specific TA value is, for the first propagation delay, a slot in which the uplink signaling is expected to arrive at the satellite based at least in part on validated ephemeris information and a true satellite position of the satellite.

In an eighth aspect, alone or in combination with one or more of the first through seventh aspects, the reference timing of the UE-specific TA value is, for the second propagation delay, a slot in which the downlink signaling corresponding to the reference timing of the downlink signaling is expected to arrive at the satellite based at least in part on: an actual received time of the slot, validated ephemeris information with no error except for quantization, and a UE propagation model.

In a ninth aspect, alone or in combination with one or more of the first through eighth aspects, the reference timing of the UE-specific TA value is, for the first propagation delay, a slot in which the uplink signaling is expected to arrive at the satellite based at least in part on validated ephemeris information and a UE propagation model.

In a tenth aspect, alone or in combination with one or more of the first through ninth aspects, the reference timing of the UE-specific TA value is, for the second propagation delay, a slot in which the downlink signaling corresponding to the reference timing of the downlink signaling is expected to arrive at the satellite based at least in part on: an actual received time of the slot, validated ephemeris information, and a UE propagation model.

In an eleventh aspect, alone or in combination with one or more of the first through tenth aspects, a reference timing of the common TA value is for a first propagation delay on a feeder link between a satellite associated with the NTN and a serving gateway associated with the serving node, or a second propagation delay on the feeder link.

In a twelfth aspect, alone or in combination with one or more of the first through eleventh aspects, a reference timing of the common TA value is based at least in part on related parameters received from the serving node.

In a thirteenth aspect, alone or in combination with one or more of the first through twelfth aspects, process 700 includes receiving, from the serving node, one or more open-loop TA control related parameters, and adjusting a downlink frame boundary associated with the reference timing of the downlink transmission based at least in part on the one or more open-loop TA control related parameters.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
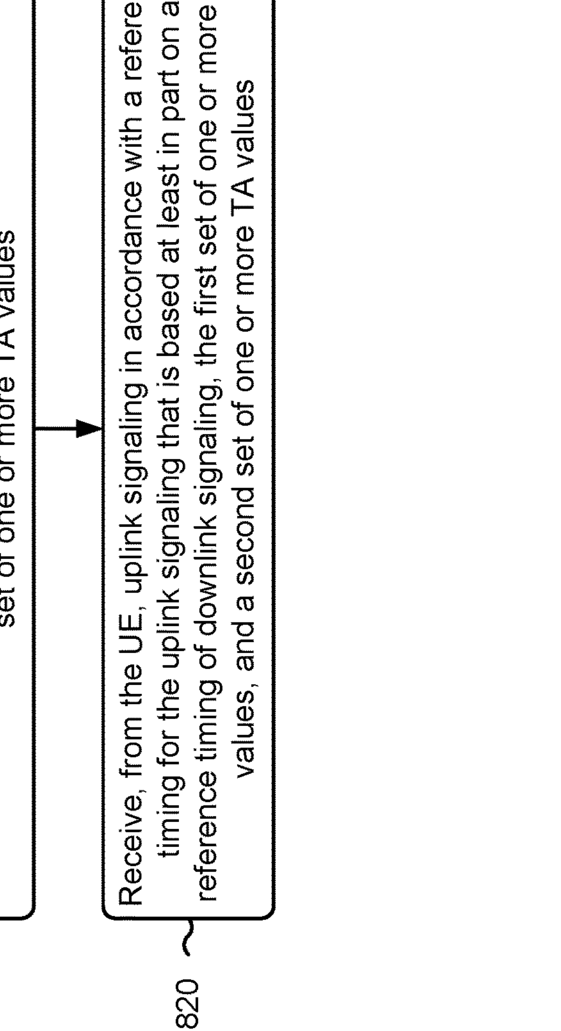

FIG. 8 is a diagram illustrating an example process 800 performed, for example, by a serving node, in accordance with the present disclosure. Example process 800 is an example where the serving node (e.g., base station 110) performs operations associated with reference timing for an uplink transmission in an NTN.

As shown in FIG. 8, in some aspects, process 800 may include transmitting, to a UE associated with an NTN, a first set of one or more TA values (block 810). For example, the serving node (e.g., using transmission component 1204, depicted in FIG. 12) may transmit, to a UE associated with an NTN, a first set of one or more TA values, as described above.

As further shown in FIG. 8, in some aspects, process 800 may include receiving, from the UE, an uplink signaling in accordance with a reference timing for the uplink signaling based at least in part on a reference timing of a downlink signaling, the first set of one or more TA values, and a second set of one or more TA values (block 820). For example, the serving node (e.g., using reception component 1202, depicted in FIG. 12) may receive, from the UE, an uplink signaling in accordance with a reference timing for the uplink signaling based at least in part on a reference timing of a downlink signaling, the first set of one or more TA values, and a second set of one or more TA values, as described above.

Process 800 may include additional aspects, such as any single aspect or any combination of aspects described below and/or in connection with one or more other processes described elsewhere herein.

In a first aspect, the reference timing of the downlink signaling is a downlink slot corresponding to an uplink slot associated with the uplink signaling.

In a second aspect, alone or in combination with the first aspect, the reference timing for the uplink signaling is the reference timing of the downlink signaling minus a total of the first set of one or more TA values and the second set of one or more TA values multiplied by a basic time unit ($T_c$).

In a third aspect, alone or in combination with one or more of the first and second aspects, the first set of one or more TA values or the second set of one or more TA values include one or more of: a TA value ($N_{TA}$), a UE-specific TA value ($N_{TA,UE\text{-}specific}$), a common TA value ($N_{TA,common}$), or a TA offset value ($N_{TA,offset}$).

In a fourth aspect, alone or in combination with one or more of the first through third aspects, a reference timing of the UE-specific TA value is for: a first propagation delay on a service link between the UE and a satellite associated with the NTN, or a second propagation delay on the service link.

In a fifth aspect, alone or in combination with one or more of the first through fourth aspects, the reference timing of the UE-specific TA value is, for the first propagation delay, a slot in which the uplink signaling is expected to arrive at the satellite based at least in part on a true satellite position of the satellite.

In a sixth aspect, alone or in combination with one or more of the first through fifth aspects, the reference timing of the UE-specific TA value is, for the second propagation delay, a slot in which the downlink signaling corresponding to the reference timing of the downlink signaling is expected to arrive at the satellite based at least in part on a true satellite position of the satellite and an actual received time of the slot.

In a seventh aspect, alone or in combination with one or more of the first through sixth aspects, the reference timing of the UE-specific TA value is, for the first propagation delay, a slot in which the uplink signaling is expected to arrive at the satellite based at least in part on validated ephemeris information and a true satellite position of the satellite.

In an eighth aspect, alone or in combination with one or more of the first through seventh aspects, the reference timing of the UE-specific TA value is, for the second propagation delay, a slot in which the downlink signaling corresponding to the reference timing of the downlink signaling is expected to arrive at the satellite based at least in part on: an actual received time of the slot, validated ephemeris information with no error except for quantization, and a UE propagation model.

In a ninth aspect, alone or in combination with one or more of the first through eighth aspects, the reference timing of the UE-specific TA value is, for the first propagation delay, a slot in which the uplink signaling is expected to arrive at the satellite based at least in part on validated ephemeris information and a UE propagation model.

In a tenth aspect, alone or in combination with one or more of the first through ninth aspects, the reference timing of the UE-specific TA value is, for the second propagation delay, a slot in which the downlink signaling corresponding to the reference timing of the downlink signaling is expected to arrive at the satellite based at least in part on: an actual received time of the slot, validated ephemeris information, and a UE propagation model.

In an eleventh aspect, alone or in combination with one or more of the first through tenth aspects, a reference timing of the common TA value is for a first propagation delay on a feeder link between a satellite associated with the NTN and a serving gateway associated with the serving node, or a second propagation delay on the feeder link.

In a twelfth aspect, alone or in combination with one or more of the first through eleventh aspects, a reference timing of the common TA value is based at least in part on related parameters broadcast from the serving node.

In a thirteenth aspect, alone or in combination with one or more of the first through twelfth aspects, process 800 includes transmitting, to the UE, one or more open-loop TA control related parameters for adjusting a downlink frame boundary associated with the reference timing of the downlink signaling.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
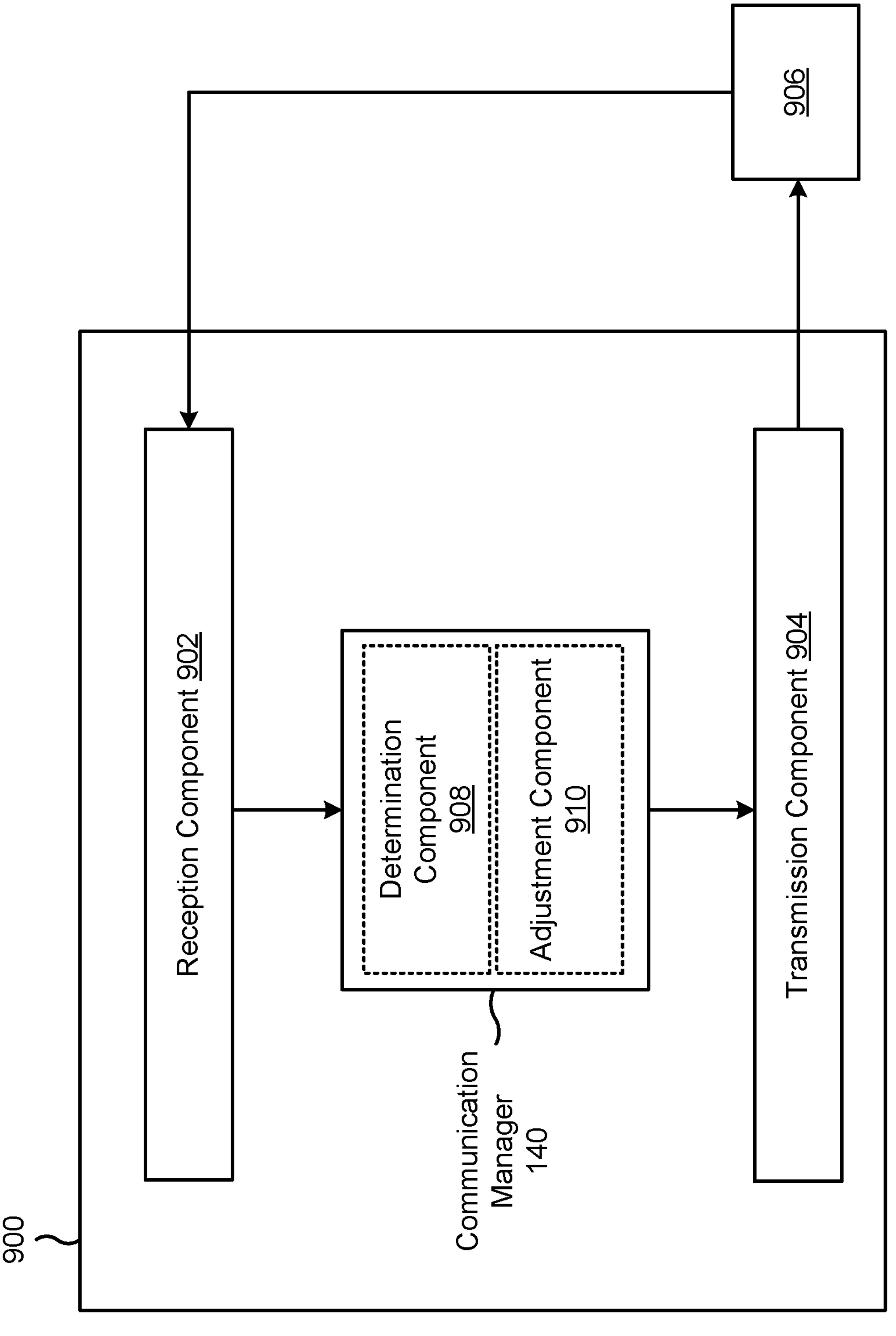
FIG. 9 is a diagram of an example apparatus for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a determination component 908, or an adjustment component 910, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive, from a serving node associated with an NTN, a first set of one or more TA values. The determination component 908 may determine a second set of one or more TA values. The determination component 908 may determine a reference timing for uplink signaling in the NTN based at least in part on a reference timing of downlink signaling, the first set of one or more TA values, and the second set of one or more TA values. The transmission component 904 may transmit, to a serving node of the NTN, the uplink signaling based at least in part on the reference timing of the uplink signaling.

The reception component 902 may receive, from the serving node, one or more open-loop TA control related parameters. The adjustment component 910 may adjust a downlink frame boundary associated with the reference timing of the downlink signaling based at least in part on the one or more open-loop TA control related parameters.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
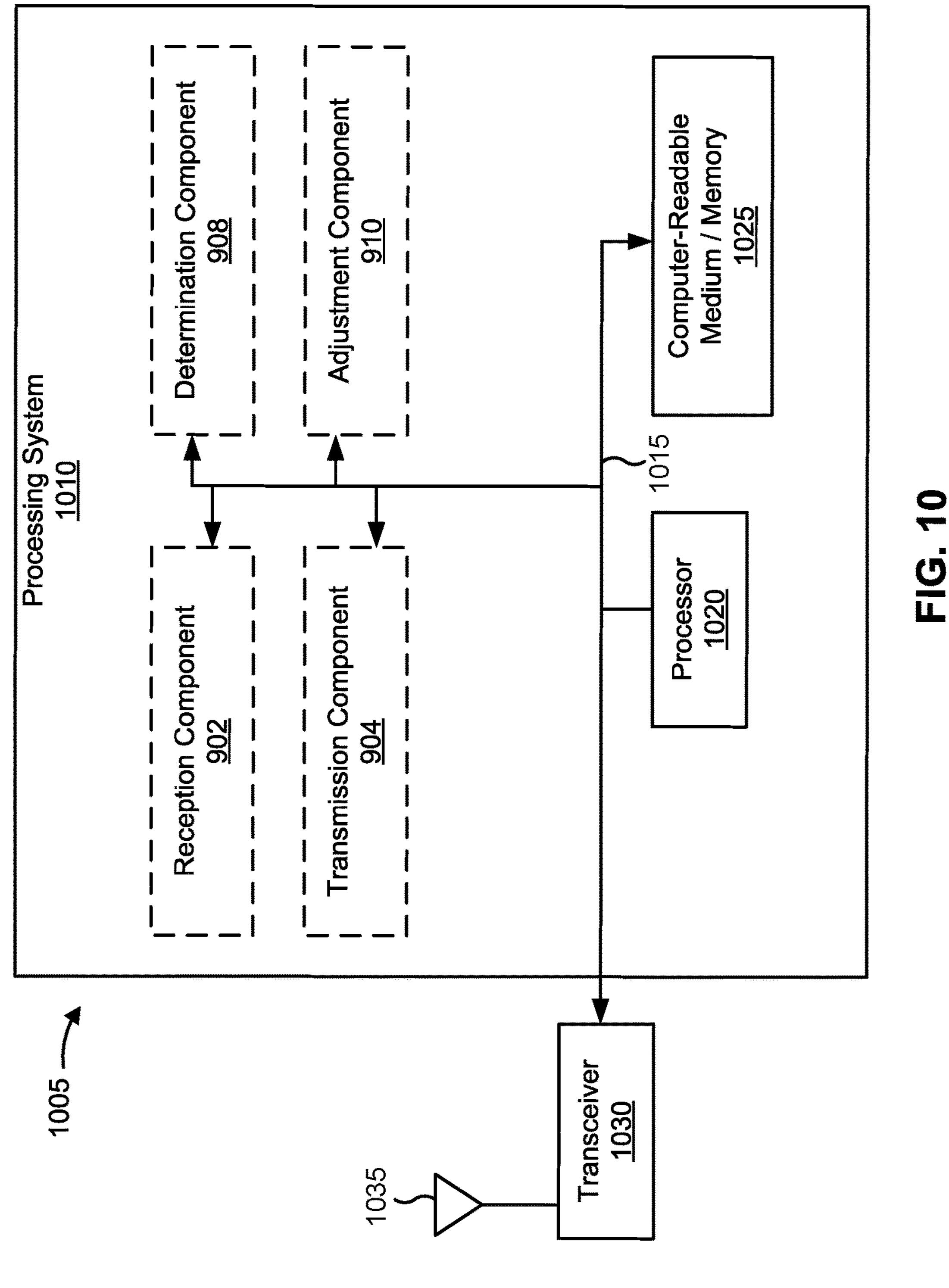
FIG. 10 is a diagram illustrating an example of a hardware implementation for an apparatus employing a processing system, in accordance with the present disclosure.

FIG. 10 is a diagram illustrating an example 1000 of a hardware implementation for an apparatus 1005 employing a processing system 1010. The apparatus 1005 may be a UE.

The processing system 1010 may be implemented with a bus architecture, represented generally by the bus 1015. The bus 1015 may include any number of interconnecting buses and bridges depending on the specific application of the processing system 1010 and the overall design constraints. The bus 1015 links together various circuits including one or more processors and/or hardware components, represented by the processor 1020, the illustrated components, and the computer-readable medium/memory 1025. The bus 1015 may also link various other circuits, such as timing sources, peripherals, voltage regulators, and/or power management circuits.

The processing system 1010 may be coupled to a transceiver 1030. The transceiver 1030 is coupled to one or more antennas 1035. The transceiver 1030 provides a means for communicating with various other apparatuses over a transmission medium. The transceiver 1030 receives a signal from the one or more antennas 1035, extracts information from the received signal, and provides the extracted information to the processing system 1010, specifically the reception component 902. In addition, the transceiver 1030 receives information from the processing system 1010, specifically the transmission component 904, and generates a signal to be applied to the one or more antennas 1035 based at least in part on the received information.

The processing system 1010 includes a processor 1020 coupled to a computer-readable medium/memory 1025. The processor 1020 is responsible for general processing, including the execution of software stored on the computer-readable medium/memory 1025. The software, when executed by the processor 1020, causes the processing system 1010 to perform the various functions described herein for any particular apparatus. The computer-readable medium/memory 1025 may also be used for storing data that is manipulated by the processor 1020 when executing software. The processing system further includes at least one of the illustrated components. The components may be software modules running in the processor 1020, resident/stored in the computer readable medium/memory 1025, one or more hardware modules coupled to the processor 1020, or some combination thereof.

In some aspects, the processing system 1010 may be a component of the UE 120 and may include the memory 282 and/or at least one of the TX MIMO processor 266, the RX processor 258, and/or the controller/processor 280. In some aspects, the apparatus 1005 for wireless communication includes means for receiving, from a serving node associated with an NTN, a first set of one or more TA values; means for determining a second set of one or more TA values; means for determining a reference timing for uplink signaling in the NTN based at least in part on a reference timing of downlink signaling, the first set of one or more TA values, and the second set of one or more TA values; and means for transmitting, to a serving node of the NTN, the uplink signaling based at least in part on the reference timing of the uplink signaling. The aforementioned means may be one or more of the aforementioned components of the apparatus 900 and/or the processing system 1010 of the apparatus 1005 configured to perform the functions recited by the aforementioned means. As described elsewhere herein, the processing system 1010 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

Figure 11:
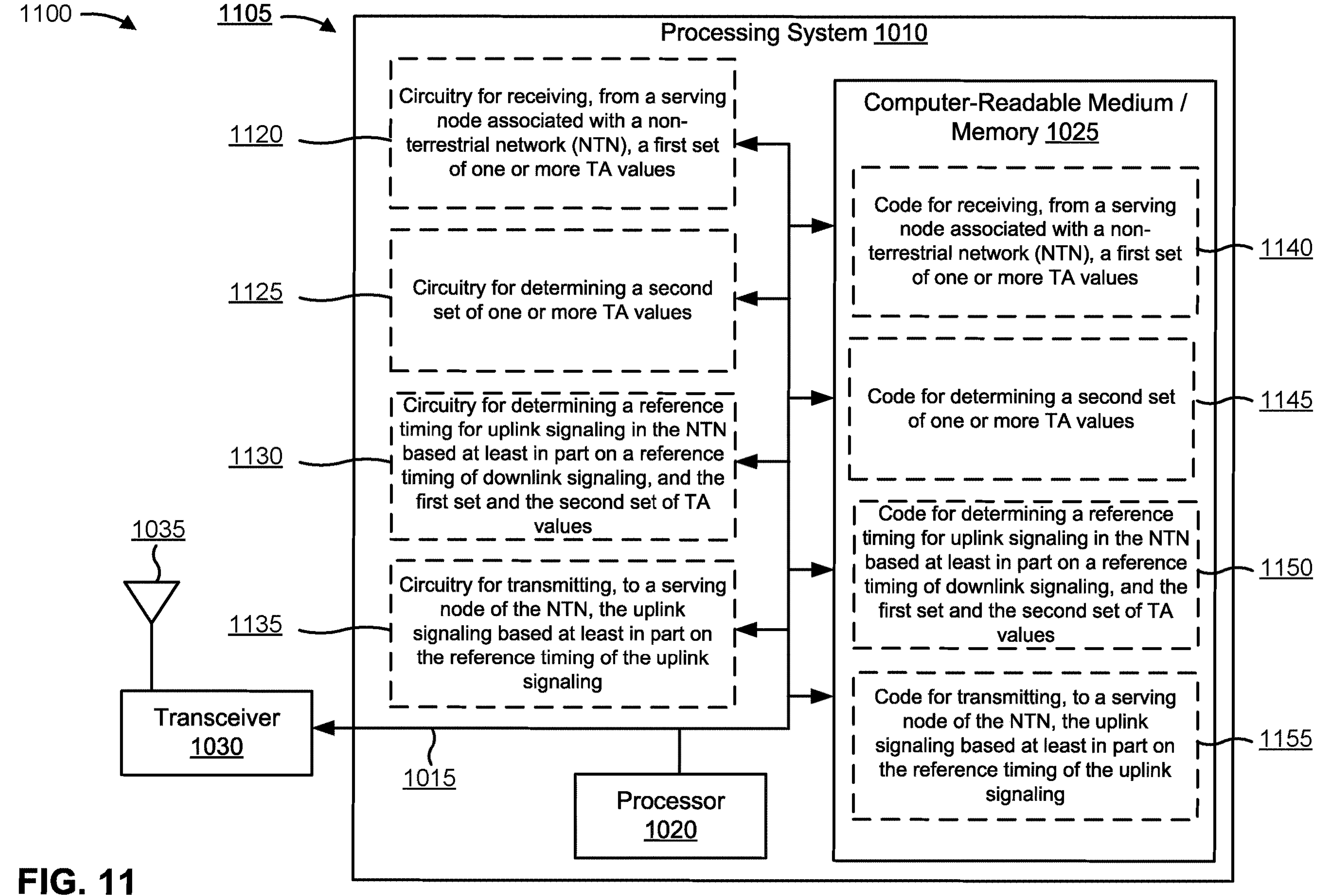
FIG. 11 is a diagram illustrating an example implementation of code and circuitry for an apparatus, in accordance with the present disclosure.

FIG. 11 is a diagram illustrating an example 1100 of an implementation of code and circuitry for an apparatus 1105. The apparatus 1105 may be a UE.

As further shown in FIG. 11, the apparatus may include circuitry for receiving, from a serving node associated with an NTN, a first set of one or more TA values (circuitry 1120). For example, the apparatus may include circuitry to enable the apparatus to receive, from a serving node associated with an NTN, a first set of one or more TA values.

As further shown in FIG. 11, the apparatus may include circuitry for determining a second set of one or more TA values (circuitry 1125). For example, the apparatus may include circuitry to enable the apparatus to determine a second set of one or more TA values.

As further shown in FIG. 11, the apparatus may include circuitry for determining a reference timing for uplink signaling in the NTN based at least in part on a reference timing of downlink signaling, the first set of one or more TA values, and the second set of one or more TA values (circuitry 1130). For example, the apparatus may include circuitry to enable the apparatus to determine a reference timing for uplink signaling in the NTN based at least in part on a reference timing of downlink signaling, the first set of one or more TA values, and the second set of one or more TA values.

As further shown in FIG. 11, the apparatus may include circuitry for transmitting, to the serving node of the NTN, the uplink signaling based at least in part on the reference timing of the uplink signaling (circuitry 1135). For example, the apparatus may include circuitry to enable the apparatus to transmit, to the serving node of the NTN, the uplink signaling based at least in part on the reference timing of the uplink signaling.

As further shown in FIG. 11, the apparatus may include, stored in computer-readable medium 1025, code for receiving, from a serving node associated with an NTN, a first set of one or more TA values (code 1140). For example, the apparatus may include code that, when executed by the processor 1020, may cause the transceiver 1030 to receive, from a serving node associated with an NTN, a first set of one or more TA values.

As further shown in FIG. 11, the apparatus may include, stored in computer-readable medium 1025, code for determining a second set of one or more TA values (code 1145). For example, the apparatus may include code that, when executed by the processor 1020, may cause the transceiver 1030 to determine a second set of one or more TA values.

As further shown in FIG. 11, the apparatus may include, stored in computer-readable medium 1025, code for determining a reference timing for uplink signaling in the NTN based at least in part on a reference timing of downlink signaling, the first set of one or more TA values, and the second set of one or more TA values (code 1150). For example, the apparatus may include code that, when executed by the processor 1020, may cause the transceiver 1030 to determine a reference timing for uplink signaling in the NTN based at least in part on a reference timing of downlink signaling, the first set of one or more TA values, and the second set of one or more TA values.

As further shown in FIG. 11, the apparatus may include, stored in computer-readable medium 1025, code for transmitting, to a serving node of the NTN, the uplink signaling based at least in part on the reference timing of the uplink signaling (code 1155). For example, the apparatus may include code that, when executed by the processor 1020, may cause the transceiver 1030 to transmit, to a serving node of the NTN, the uplink signaling based at least in part on the reference timing of the uplink signaling.

FIG. 11 is provided as an example. Other examples may differ from what is described in connection with FIG. 11.

Figure 12:
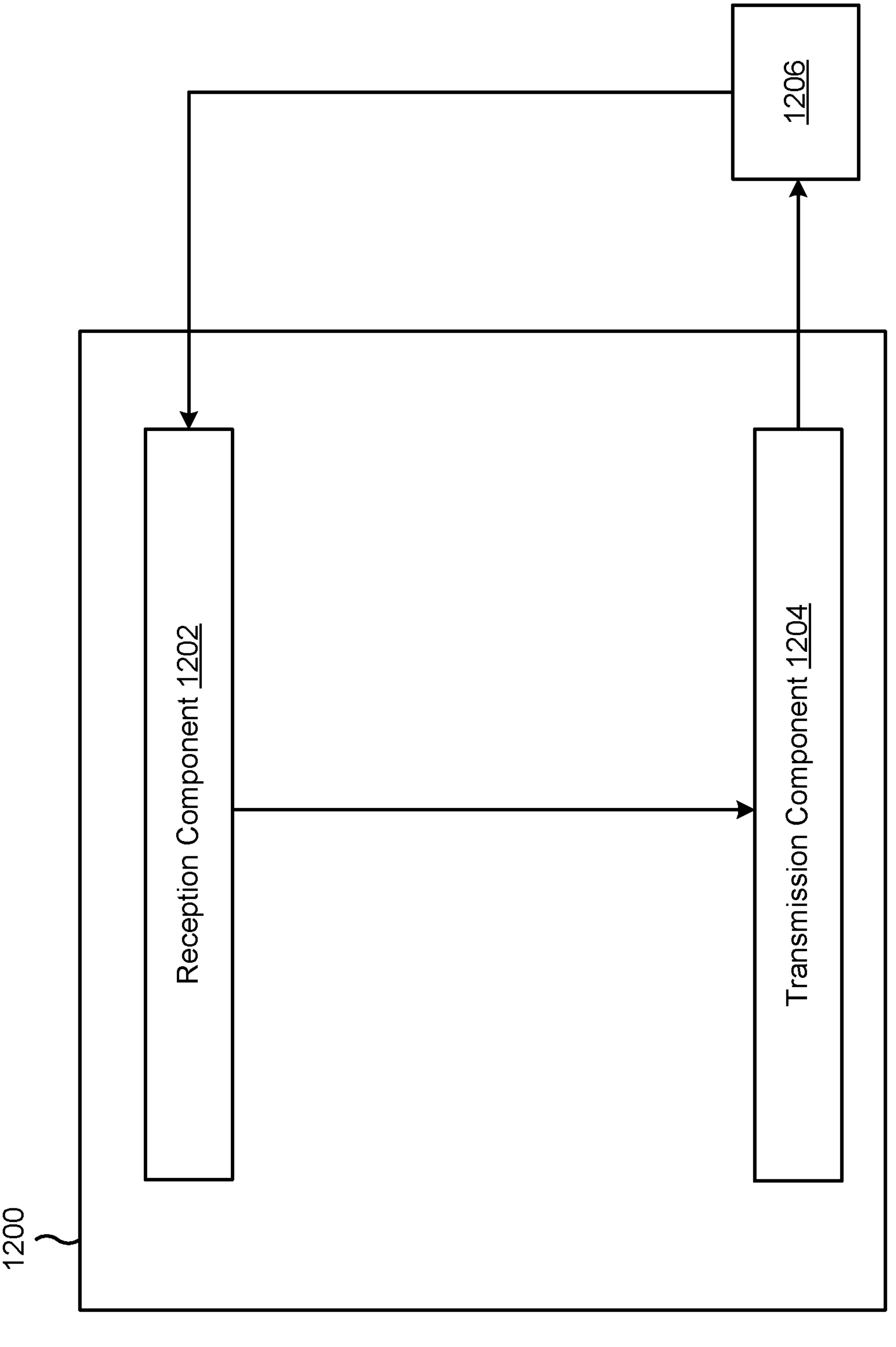
FIG. 12 is a diagram of an example apparatus for wireless communication, in accordance with the present disclosure.

FIG. 12 is a diagram of an example apparatus 1200 for wireless communication. The apparatus 1200 may be a serving node, or a serving node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204.

In some aspects, the apparatus 1200 may be configured to perform one or more operations described herein in connection with FIG. 6. Additionally, or alternatively, the apparatus 1200 may be configured to perform one or more processes described herein, such as process 800 of FIG. 8. In some aspects, the apparatus 1200 and/or one or more components shown in FIG. 12 may include one or more components of the serving node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the serving node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the serving node described in connection with FIG. 2. In some aspects, the transmission component 1204 may be co-located with the reception component 1202 in a transceiver.

The transmission component 1204 may transmit, to a UE associated with an NTN, a first set of one or more TA values. The reception component 1202 may receive, from the UE, uplink signaling in accordance with a reference timing for the uplink signaling that is based at least in part on a reference timing of downlink signaling, the first set of one or more TA values, and a second set of one or more TA values. The transmission component 1204 may transmit, to the UE, one or more open-loop TA control related parameters for adjusting a downlink frame boundary associated with the reference timing of the downlink signaling.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
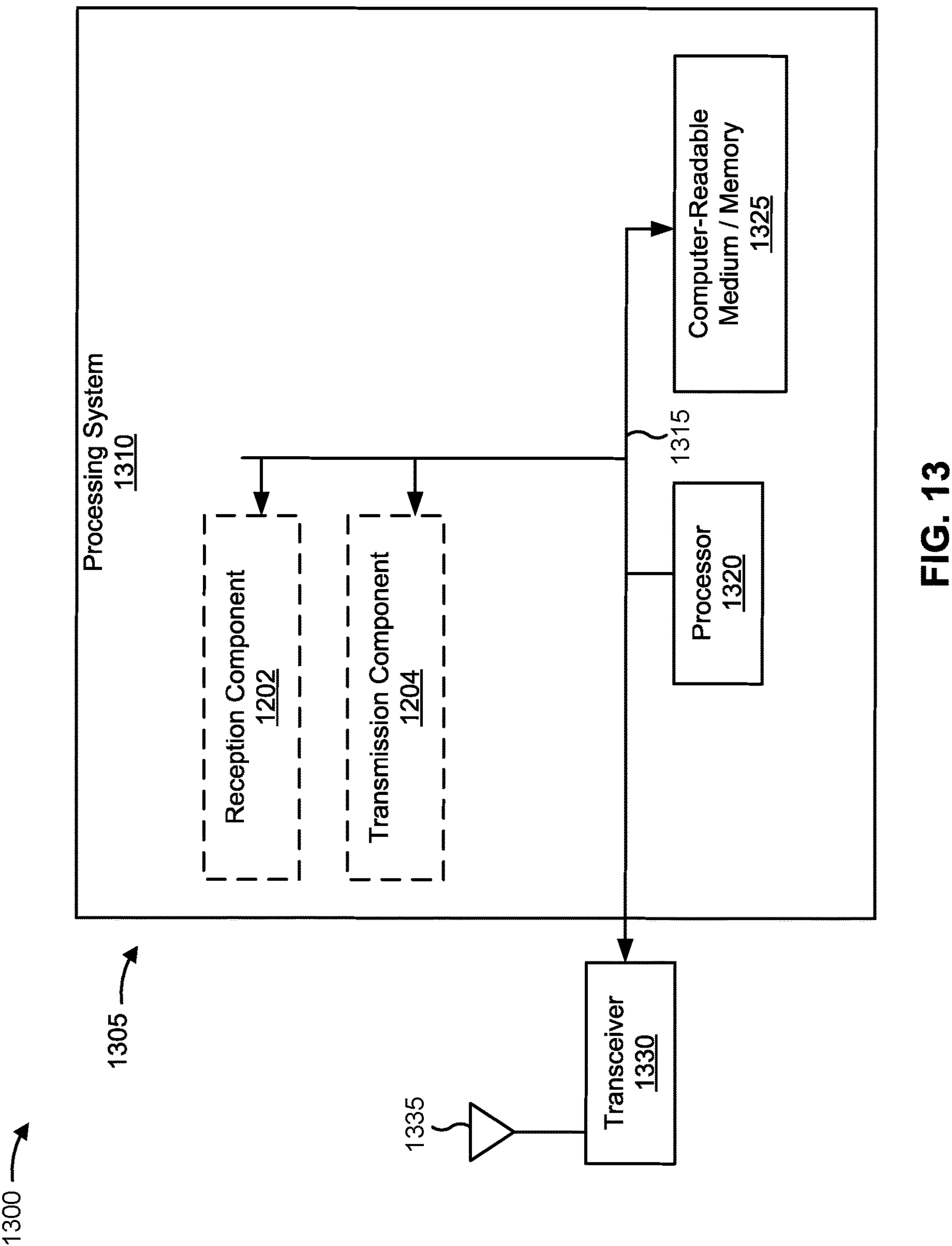
FIG. 13 is a diagram illustrating an example of a hardware implementation for an apparatus employing a processing system, in accordance with the present disclosure.

FIG. 13 is a diagram illustrating an example 1300 of a hardware implementation for an apparatus 1305 employing a processing system 1310. The apparatus 1305 may be a serving node (e.g., base station 110).

The processing system 1310 may be implemented with a bus architecture, represented generally by the bus 1315. The bus 1315 may include any number of interconnecting buses and bridges depending on the specific application of the processing system 1310 and the overall design constraints. The bus 1315 links together various circuits including one or more processors and/or hardware components, represented by the processor 1320, the illustrated components, and the computer-readable medium/memory 1325. The bus 1315 may also link various other circuits, such as timing sources, peripherals, voltage regulators, and/or power management circuits.

The processing system 1310 may be coupled to a transceiver 1330. The transceiver 1330 is coupled to one or more antennas 1335. The transceiver 1330 provides a means for communicating with various other apparatuses over a transmission medium. The transceiver 1330 receives a signal from the one or more antennas 1335, extracts information from the received signal, and provides the extracted information to the processing system 1310, specifically the reception component 1202. In addition, the transceiver 1330 receives information from the processing system 1310, specifically the transmission component 1204, and generates a signal to be applied to the one or more antennas 1335 based at least in part on the received information.

The processing system 1310 includes a processor 1320 coupled to a computer-readable medium/memory 1325. The processor 1320 is responsible for general processing, including the execution of software stored on the computer-readable medium/memory 1325. The software, when executed by the processor 1320, causes the processing system 1310 to perform the various functions described herein for any particular apparatus. The computer-readable medium/memory 1325 may also be used for storing data that is manipulated by the processor 1320 when executing software. The processing system further includes at least one of the illustrated components. The components may be software modules running in the processor 1320, resident/stored in the computer readable medium/memory 1325, one or more hardware modules coupled to the processor 1320, or some combination thereof.

In some aspects, the processing system 1310 may be a component of the base station 110 and may include the memory 242 and/or at least one of the TX MIMO processor 230, the RX processor 238, and/or the controller/processor 240. In some aspects, the apparatus 1305 for wireless communication includes means for transmitting, to a UE associated with an NTN, a first set of one or more TA values; and means for receiving, from the UE, uplink signaling in accordance with a reference timing for the uplink signaling that is based at least in part on a reference timing of downlink signaling, the first set of one or more TA values, and a second set of one or more TA values. The aforementioned means may be one or more of the aforementioned components of the apparatus 1200 and/or the processing system 1310 of the apparatus 1305 configured to perform the functions recited by the aforementioned means. As described elsewhere herein, the processing system 1310 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 13 is provided as an example. Other examples may differ from what is described in connection with FIG. 13.

Figure 14:
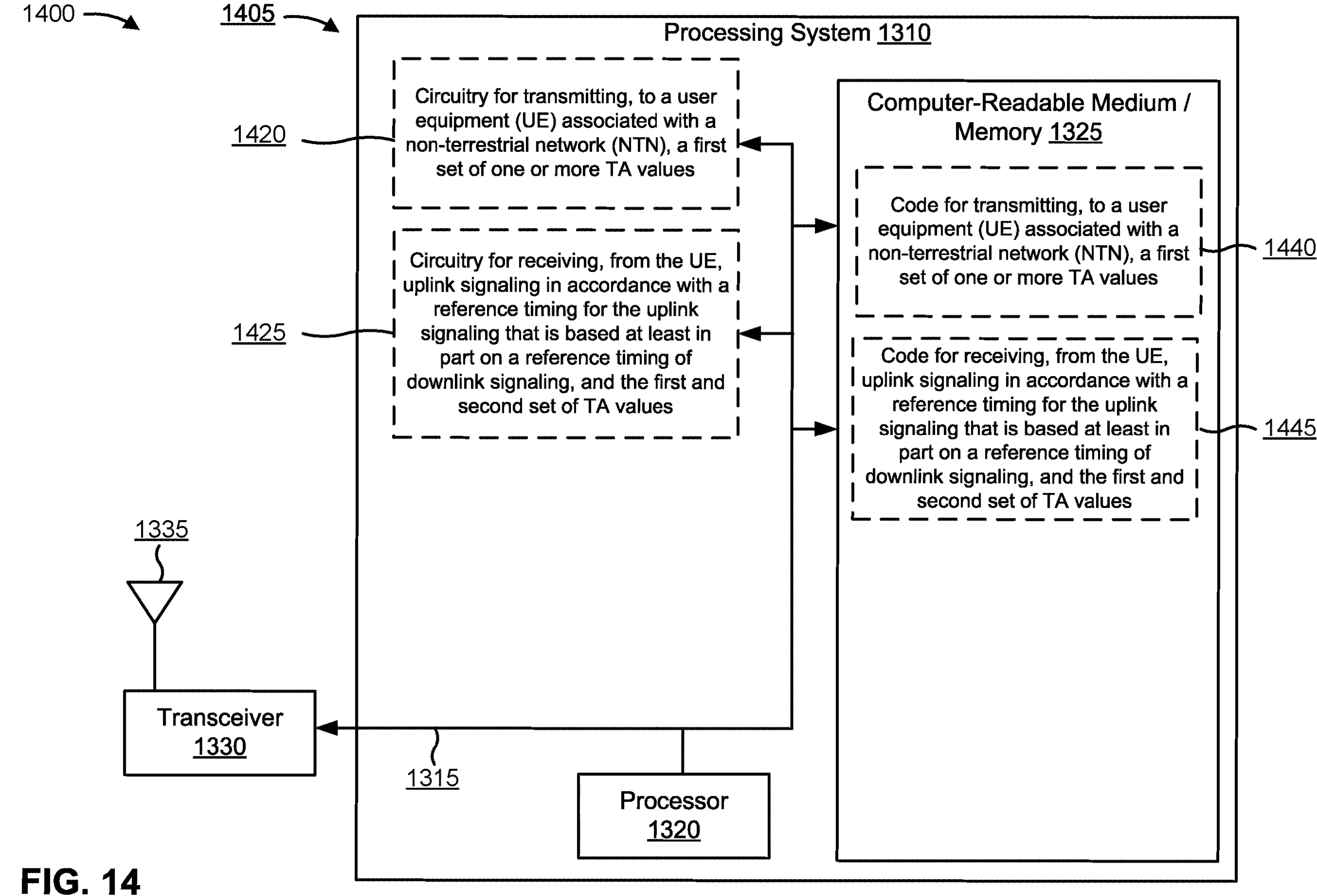
FIG. 14 is a diagram illustrating an example implementation of code and circuitry for an apparatus, in accordance with the present disclosure.

FIG. 14 is a diagram illustrating an example 1400 of an implementation of code and circuitry for an apparatus 1405. The apparatus 1405 may be a serving node (e.g., base station 110).

As further shown in FIG. 14, the apparatus may include circuitry for transmitting, to a UE associated with an NTN, a first set of one or more TA values (circuitry 1420). For example, the apparatus may include circuitry to enable the apparatus to transmit, to a UE associated with an NTN, a first set of one or more TA values.

As further shown in FIG. 14, the apparatus may include circuitry for receiving, from the UE, uplink signaling in accordance with a reference timing for the uplink signaling that is based at least in part on a reference timing of downlink signaling, the first set of one or more TA values, and a second set of one or more TA values (circuitry 1425). For example, the apparatus may include circuitry to enable the apparatus to receive, from the UE, uplink signaling in accordance with a reference timing for the uplink signaling that is based at least in part on a reference timing of downlink signaling, the first set of one or more TA values, and a second set of one or more TA values.

As further shown in FIG. 14, the apparatus may include, stored in computer-readable medium 1325, code for transmitting, to a UE associated with an NTN, a first set of one or more TA values (code 1440). For example, the apparatus may include code that, when executed by the processor 1320, may cause the transceiver 1330 to transmit, to a UE associated with an NTN, a first set of one or more TA values.

As further shown in FIG. 14, the apparatus may include, stored in computer-readable medium 1325, code for receiving, from the UE, uplink signaling in accordance with a reference timing for the uplink signaling that is based at least in part on a reference timing of downlink signaling, the first set of one or more TA values, and a second set of one or more TA values (code 1445). For example, the apparatus may include code that, when executed by the processor 1320, may cause the transceiver 1330 to receive, from the UE, uplink signaling in accordance with a reference timing for the uplink signaling that is based at least in part on a reference timing of downlink signaling, the first set of one or more TA values, and a second set of one or more TA values.

FIG. 14 is provided as an example. Other examples may differ from what is described in connection with FIG. 14.

Figure 15:
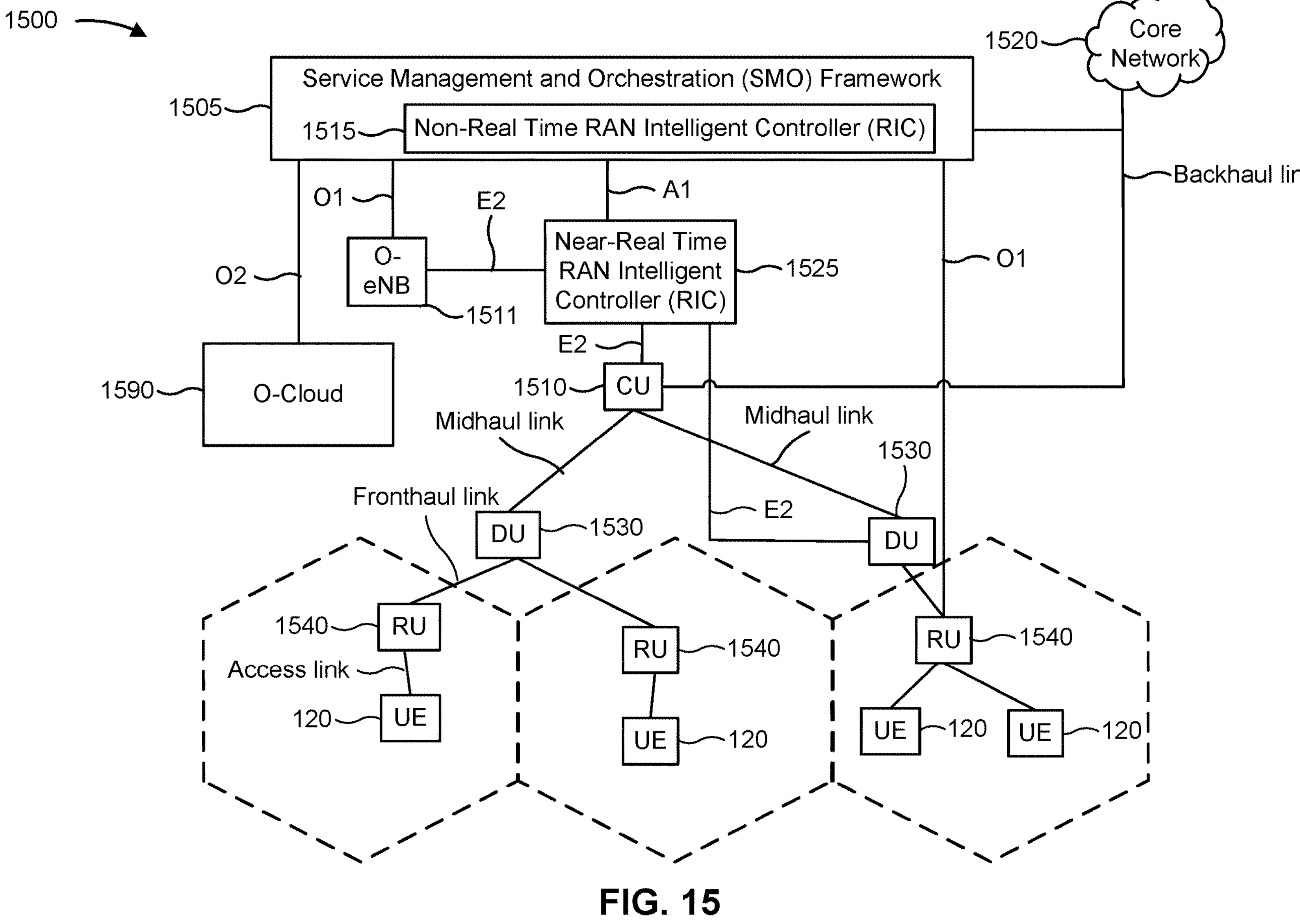
FIG. 15 is a diagram illustrating an example of a disaggregated base station architecture, in accordance with the present disclosure.

FIG. 15 is a diagram illustrating an example 1500 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, e.g., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 15 may include one or more CUs 1510 that can communicate directly with a core network 1520 via a backhaul link, or indirectly with the core network 1520 through one or more disaggregated base station units (such as a Near-RT RIC 1525 via an E2 link, or a Non-RT RIC 1515 associated with a Service Management and Orchestration (SMO) Framework 1505, or both). A CU 1510 may communicate with one or more DUs 1530 via respective midhaul links, such as an F1 interface. The DUs 1530 may communicate with one or more RUs 1540 via respective fronthaul links. The RUs 1540 may communicate with respective UEs 120 via one or more radio frequency (RF) access links. In some implementations, the UE 120 may be simultaneously served by multiple RUs 1540.

Each of the units (e.g., the CUs 1510, the DUs 1530, the RUs 1540), as well as the Near-RT RICs 1525, the Non-RT RICs 1515, and the SMO Framework 1505, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1510 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1510. The CU 1510 may be configured to handle user plane functionality (e.g., Central Unit—User Plane (CU-UP)), control plane functionality (e.g., Central Unit—Control Plane (CU-CP)), or a combination thereof. In some implementations, the CU 1510 can be logically split into one or more CU-UP units and one or more CU-CP units. The CU-UP unit can communicate bidirectionally with the CU-CP unit via an interface, such as the E1 interface when implemented in an O-RAN configuration. The CU 1510 can be implemented to communicate with the DU 1530, as necessary, for network control and signaling.

The DU 1530 may correspond to a logical unit that includes one or more base station functions to control the operation of one or more RUs 1540. In some aspects, the DU 1530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 1530 may further host one or more low-PHY layers. Each layer (or module) can be implemented with an interface configured to communicate signals with other layers (and modules) hosted by the DU 1530, or with the control functions hosted by the CU 1510.

Lower-layer functionality can be implemented by one or more RUs 1540. In some deployments, an RU 1540, controlled by a DU 1530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1540 can be implemented to handle over the air (OTA) communication with one or more UEs 120. In some implementations, real-time and non-real-time aspects of control and user plane communication with the RU(s) 1540 can be controlled by the corresponding DU 1530. In some scenarios, this configuration can enable the DU(s) 1530 and the CU 1510 to be implemented in a cloud-based RAN architecture, such as a vRAN architecture.

The SMO Framework 1505 may be configured to support RAN deployment and provisioning of non-virtualized and virtualized network elements. For non-virtualized network elements, the SMO Framework 1505 may be configured to support the deployment of dedicated physical resources for RAN coverage requirements which may be managed via an operations and maintenance interface (such as an O1 interface). For virtualized network elements, the SMO Framework 1505 may be configured to interact with a cloud computing platform (such as an open cloud (O-Cloud) 1590) to perform network element life cycle management (such as to instantiate virtualized network elements) via a cloud computing platform interface (such as an O2 interface). Such virtualized network elements can include, but are not limited to, CUs 1510, DUs 1530, RUs 1540 and Near-RT RICs 1525. In some implementations, the SMO Framework 1505 can communicate with a hardware aspect of a 4G RAN, such as an open eNB (O-eNB) 1511, via an O1 interface. Additionally, in some implementations, the SMO Framework 1505 can communicate directly with one or more RUs 1540 via an O1 interface. The SMO Framework 1505 also may include a Non-RT RIC 1515 configured to support functionality of the SMO Framework 1505.

The Non-RT RIC 1515 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1525. The Non-RT RIC 1515 may be coupled to or communicate with (such as via an A1 interface) the Near-RT RIC 1525. The Near-RT RIC 1525 may be configured to include a logical function that enables near-real-time control and optimization of RAN elements and resources via data collection and actions over an interface (such as via an E2 interface) connecting one or more CUs 1510, one or more DUs 1530, or both, as well as an O-eNB, with the Near-RT RIC 1525.

In some implementations, to generate AI/ML models to be deployed in the Near-RT RIC 1525, the Non-RT RIC 1515 may receive parameters or external enrichment information from external servers. Such information may be utilized by the Near-RT RIC 1525 and may be received at the SMO Framework 1505 or the Non-RT RIC 1515 from non-network data sources or from network functions. In some examples, the Non-RT RIC 1515 or the Near-RT RIC 1525 may be configured to tune RAN behavior or performance. For example, the Non-RT RIC 1515 may monitor long-term trends and patterns for performance and employ AI/ML models to perform corrective actions through the SMO Framework 1505 (such as reconfiguration via O1) or via creation of RAN management policies (such as A1 policies).

As indicated above, FIG. 15 is provided as an example. Other examples may differ from what is described with regard to FIG. 15.

Figure 16:
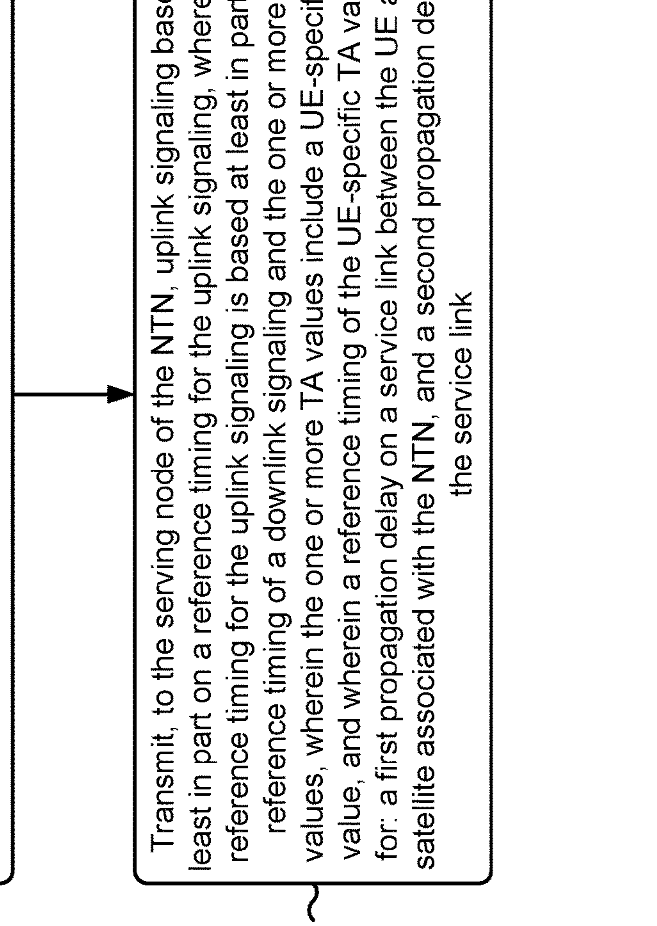
FIGS. 16-17 are diagrams illustrating example processes associated with a reference timing for an uplink transmission in an NTN, in accordance with the present disclosure.

FIG. 16 is a diagram illustrating an example process 1600 performed, for example, by a UE, in accordance with the present disclosure. Example process 1600 is an example where the UE (e.g., UE 120) performs operations associated with reference timing for an uplink transmission in an NTN.

As shown in FIG. 16, in some aspects, process 1600 may include receiving, from a serving node of an NTN, one or more TA values (block 1610). For example, the UE (e.g., using communication manager 140 and/or reception component 902, depicted in FIG. 9) may receive, from a serving node of an NTN, one or more TA values, as described above.

As further shown in FIG. 16, in some aspects, process 1600 may include transmitting, to the serving node of the NTN, uplink signaling based at least in part on a reference timing for the uplink signaling, wherein the reference timing for the uplink signaling is based at least in part on a reference timing of a downlink signaling and the one or more TA values, wherein the one or more TA values include a UE-specific TA value, and wherein a reference timing of the UE-specific TA value is for: a first propagation delay on a service link between the UE and a satellite associated with the NTN, and a second propagation delay on the service link (block 1640). For example, the UE (e.g., using communication manager 140 and/or transmission component 904, depicted in FIG. 9) may transmit, to the serving node of the NTN, uplink signaling based at least in part on a reference timing for the uplink signaling, wherein the reference timing for the uplink signaling is based at least in part on a reference timing of a downlink signaling and the one or more TA values, wherein the one or more TA values include a UE-specific TA value, and wherein a reference timing of the UE-specific TA value is for: a first propagation delay on a service link between the UE and a satellite associated with the NTN, and a second propagation delay on the service link, as described above.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
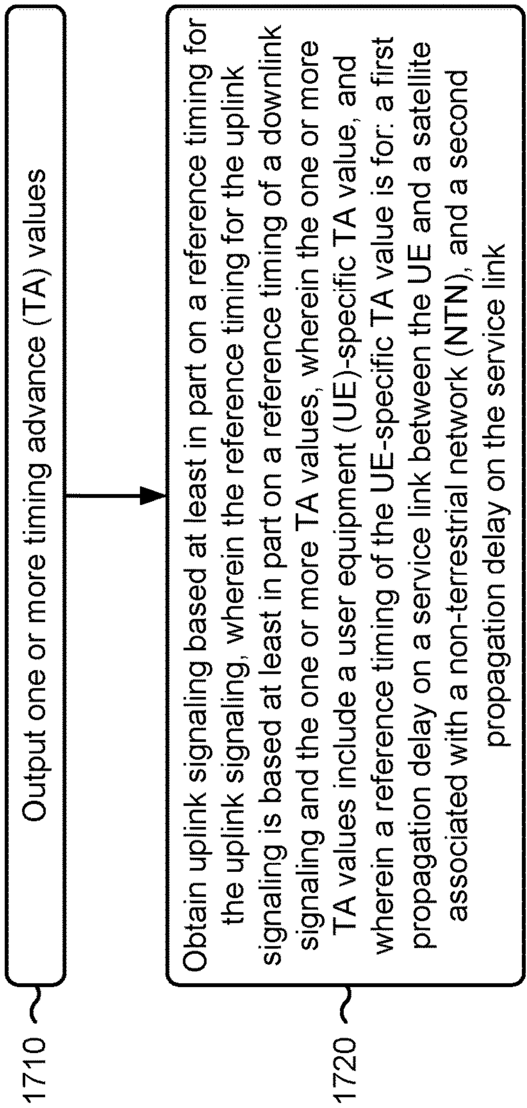

FIG. 17 is a diagram illustrating an example process 1700 performed, for example, by a serving node, in accordance with the present disclosure. Example process 1700 is an example where the serving node (e.g., base station 110) performs operations associated with reference timing for an uplink transmission in an NTN.

As shown in FIG. 17, in some aspects, process 1700 may include outputting one or more TA values (block 1710). For example, the serving node (e.g., using transmission component 1204, depicted in FIG. 12) may output one or more TA values, as described above.

As further shown in FIG. 17, in some aspects, process 1700 may include obtaining uplink signaling based at least in part on a reference timing for the uplink signaling, wherein the reference timing for the uplink signaling is based at least in part on a reference timing of a downlink signaling and the one or more TA values, wherein the one or more TA values include a UE-specific TA value, and wherein a reference timing of the UE-specific TA value is for: a first propagation delay on a service link between the UE and a satellite associated with an NTN, and a second propagation delay on the service link (block 1720). For example, the serving node (e.g., using reception component 1202, depicted in FIG. 12) may obtain uplink signaling based at least in part on a reference timing for the uplink signaling, wherein the reference timing for the uplink signaling is based at least in part on a reference timing of a downlink signaling and the one or more TA values, wherein the one or more TA values include a UE-specific TA value, and wherein a reference timing of the UE-specific TA value is for: a first propagation delay on a service link between the UE and a satellite associated with an NTN, and a second propagation delay on the service link, as described above.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

The following provides an overview of some Aspects of the present disclosure:

Aspect 1: A method of wireless communication performed by a user equipment (UE), comprising: receiving, from a serving node of a non-terrestrial network (NTN), one or more timing advance (TA) values; and transmitting, to the serving node of the NTN, uplink signaling based at least in part on a reference timing for the uplink signaling, wherein the reference timing for the uplink signaling is based at least in part on a reference timing of a downlink signaling and the one or more TA values, wherein the one or more TA values include a UE-specific TA value, and wherein a reference timing of the UE-specific TA value is for: a first propagation delay on a service link between the UE and a satellite associated with the NTN, and a second propagation delay on the service link.

Aspect 2: The method of Aspect 1, wherein the reference timing of the UE-specific TA value is, for the first propagation delay, a slot in which the uplink signaling is expected to arrive at the satellite based at least in part on validated ephemeris information and a reference propagation model.

Aspect 3: The method of any of Aspects 1 through 2, wherein the reference timing of the UE-specific TA value is, for the second propagation delay, a slot in which the downlink signaling, corresponding to a slot of the uplink signaling, is expected to arrive at the satellite based at least in part on: validated ephemeris information and a reference propagation model.

Aspect 4: The method of any of Aspects 1 through 3, wherein the reference timing of the UE-specific TA value is based at least in part on an actual received time of the slot.

Aspect 5: The method of any of Aspects 1 through 4, wherein the reference timing of the downlink signaling is a downlink slot corresponding to an uplink slot associated with the uplink signaling.

Aspect 6: The method of any of Aspects 1 through 5, wherein the reference timing for the uplink signaling is the reference timing of the downlink signaling minus a total of the one or more TA values multiplied by a basic time unit ($T_c$).

Aspect 7: The method of any of Aspects 1 through 6, wherein the one or more TA values includes one or more of: a TA value ($N_{TA}$), a common TA value ($N_{TA,common}$), or a TA offset value ($N_{TA,offset}$).

Aspect 8: The method of any of Aspects 1 through 7, wherein a reference timing of the common TA value is based at least in part on related parameters received from the serving node.

Aspect 9: The method of any of Aspects 1 through 8, wherein the reference timing of the UE-specific TA value is, for the first propagation delay, a slot in which the uplink signaling is expected to arrive at the satellite based at least in part on a true satellite position of the satellite.

Aspect 10: The method of any of Aspects 1 through 9, wherein the reference timing of the UE-specific TA value is, for the second propagation delay, a slot in which the downlink signaling corresponding to the reference timing of the downlink signaling is expected to arrive at the satellite based at least in part on a true satellite position of the satellite and an actual received time of the slot.

Aspect 11: The method of any of Aspects 1 through 10, wherein the reference timing of the UE-specific TA value is, for the first propagation delay, a slot in which the uplink signaling is expected to arrive at the satellite based at least in part on validated ephemeris information and a true satellite position of the satellite.

Aspect 12: The method of any of Aspects 1 through 11, wherein the reference timing of the UE-specific TA value is, for the second propagation delay, a slot in which the downlink signaling corresponding to the reference timing of the downlink signaling is expected to arrive at the satellite based at least in part on: an actual received time of the slot, validated ephemeris information with no error except for quantization, and a reference propagation model.

Aspect 13: The method of any of Aspects 1 through 12, further comprising: receiving, from the serving node, one or more open-loop TA control related parameters; and adjusting a downlink frame boundary associated with the reference timing of the downlink signaling based at least in part on the one or more open-loop TA control related parameters.

Aspect 14: A method of wireless communication performed by a serving node, comprising: outputting one or more timing advance (TA) values; and obtaining uplink signaling based at least in part on a reference timing for the uplink signaling, wherein the reference timing for the uplink signaling is based at least in part on a reference timing of a downlink signaling and the one or more TA values, wherein the one or more TA values include a UE-specific TA value, and wherein a reference timing of the UE-specific TA value is for: a first propagation delay on a service link between the UE and a satellite associated with the NTN, and a second propagation delay on the service link.

Aspect 15: The method of Aspect 14, wherein the reference timing of the UE-specific TA value is, for the first propagation delay, a slot in which the uplink signaling is expected to arrive at the satellite based at least in part on validated ephemeris information and a reference propagation model.

Aspect 16: The method of any of Aspects 14 through 15, wherein the reference timing of the UE-specific TA value is, for the second propagation delay, a slot in which the downlink signaling, corresponding to a slot of the uplink signaling, is expected to arrive at the satellite based at least in part on: validated ephemeris information and a reference propagation model.

Aspect 17: The method of any of Aspects 14 through 16, wherein the reference timing of the UE-specific TA value is based at least in part on an actual received time of the slot.

Aspect 18: The method of any of Aspects 14 through 17, wherein the reference timing of the downlink signaling is a downlink slot corresponding to an uplink slot associated with the uplink signaling.

Aspect 19: The method of any of Aspects 14 through 18, wherein the reference timing for the uplink signaling is the reference timing of the downlink signaling minus a total of the one or more TA values multiplied by a basic time unit ($T_c$).

Aspect 20: The method of any of Aspects 14 through 19, wherein the one or more TA values includes one or more of: a TA value ($N_{TA}$), a common TA value ($N_{TA,common}$), or a TA offset value ($N_{TA,offset}$).

Aspect 21: The method of Aspect 20, wherein a reference timing of the common TA value is based at least in part on related parameters broadcast from the serving node.

Aspect 22: The method of any of Aspects 14 through 21, wherein the reference timing of the UE-specific TA value is, for the first propagation delay, a slot in which the uplink signaling is expected to arrive at the satellite based at least in part on a true satellite position of the satellite.

Aspect 23: The method of any of Aspects 14 through 22, wherein the reference timing of the UE-specific TA value is, for the second propagation delay, a slot in which the downlink signaling corresponding to the reference timing of the downlink signaling is expected to arrive at the satellite based at least in part on a true satellite position of the satellite and an actual received time of the slot.

Aspect 24: The method of any of Aspects 14 through 23, wherein the reference timing of the UE-specific TA value is, for the first propagation delay, a slot in which the uplink signaling is expected to arrive at the satellite based at least in part on validated ephemeris information and a true satellite position of the satellite.

Aspect 25: The method of any of Aspects 14 through 24, wherein the reference timing of the UE-specific TA value is, for the second propagation delay, a slot in which the downlink signaling corresponding to the reference timing of the downlink signaling is expected to arrive at the satellite based at least in part on: an actual received time of the slot, validated ephemeris information with no error except for quantization, and a reference propagation model.

Aspect 26: The method of any of Aspects 14 through 25, further comprising: outputting one or more open-loop TA control related parameters for adjusting a downlink frame boundary associated with the reference timing of the downlink signaling.

Aspect 27: A method of wireless communication performed by a user equipment (UE), comprising: receiving, from a serving node of a non-terrestrial network (NTN), a first set of one or more timing advance (TA) values; and transmitting, to the serving node of the NTN, uplink signaling based at least in part on a reference timing for the uplink signaling, wherein the reference timing for the uplink signaling is based at least in part on a reference timing of a downlink signaling, the first set of one or more TA values, and a second set of one or more TA values.

Aspect 28: The method of Aspect 27, wherein the reference timing of the downlink signaling is a downlink slot corresponding to an uplink slot associated with the uplink signaling.

Aspect 29: The method of any of Aspects 27 through 28, wherein the reference timing for the uplink signaling is the reference timing of the downlink signaling minus a total of the first set of one or more TA values and the second set of one or more TA values multiplied by a basic time unit ($T_c$).

Aspect 30: The method of any of Aspects 27 through 29, wherein the first set of one or more TA values or the second set of one or more TA values include one or more of: a TA value ($N_{TA}$), a UE-specific TA value ($N_{TA,UE\text{-}specific}$), a common TA value ($N_{TA,common}$), or a TA offset value ($N_{TA,offset}$).

Aspect 31: The method of Aspect 30, wherein a reference timing of the UE-specific TA value is for: a first propagation delay on a service link between the UE and a satellite associated with the NTN, or a second propagation delay on the service link.

Aspect 32: The method of Aspect 31, wherein the reference timing of the UE-specific TA value is, for the first propagation delay, a slot in which the uplink signaling is expected to arrive at the satellite based at least in part on a true satellite position of the satellite.

Aspect 33: The method of Aspect 31, wherein the reference timing of the UE-specific TA value is, for the second propagation delay, a slot in which the downlink signaling corresponding to the reference timing of the downlink signaling is expected to arrive at the satellite based at least in part on a true satellite position of the satellite and an actual received time of the slot.

Aspect 34: The method of Aspect 31, wherein the reference timing of the UE-specific TA value is, for the first propagation delay, a slot in which the uplink signaling is expected to arrive at the satellite based at least in part on validated ephemeris information and a true satellite position of the satellite.

Aspect 35: The method of Aspect 31, wherein the reference timing of the UE-specific TA value is, for the second propagation delay, a slot in which the downlink signaling corresponding to the reference timing of the downlink signaling is expected to arrive at the satellite based at least in part on: an actual received time of the slot, validated ephemeris information with no error except for quantization, and a UE propagation model.

Aspect 36: The method of Aspect 31, wherein the reference timing of the UE-specific TA value is, for the first propagation delay, a slot in which the uplink signaling is expected to arrive at the satellite based at least in part on validated ephemeris information and a UE propagation model.

Aspect 37: The method of Aspect 31, wherein the reference timing of the UE-specific TA value is, for the second propagation delay, a slot in which the downlink signaling corresponding to the reference timing of the downlink signaling is expected to arrive at the satellite based at least in part on: an actual received time of the slot, validated ephemeris information, and a UE propagation model.

Aspect 38: The method of Aspect 30, wherein a reference timing of the common TA value is for: a first propagation delay on a feeder link between a satellite associated with the NTN and a serving gateway associated with the serving node, or a second propagation delay on the feeder link.

Aspect 39: The method of Aspect 30, wherein a reference timing of the common TA value is based at least in part on related parameters received from the serving node.

Aspect 40: The method of any of Aspects 27 through 39, further comprising: receiving, from the serving node, one or more open-loop TA control related parameters; and adjusting a downlink frame boundary associated with the reference timing of the downlink transmission based at least in part on the one or more open-loop TA control related parameters.

Aspect 41: A method of wireless communication performed by a serving node, comprising: transmitting, to a user equipment (UE) associated with a non-terrestrial network (NTN), a first set of one or more timing advance (TA) values; and receiving, from the UE, an uplink signaling in accordance with a reference timing for the uplink signaling based at least in part on a reference timing of a downlink signaling, the first set of one or more TA values, and a second set of one or more TA values.

Aspect 42: The method of Aspect 41, wherein the reference timing of the downlink signaling is a downlink slot corresponding to an uplink slot associated with the uplink signaling.

Aspect 43: The method of any of Aspects 41 through 42, wherein the reference timing for the uplink signaling is the reference timing of the downlink signaling minus a total of the first set of one or more TA values and the second set of one or more TA values multiplied by a basic time unit ($T_c$).

Aspect 44: The method of any of Aspects 41 through 43, wherein the first set of one or more TA values or the second set of one or more TA values include one or more of: a TA value ($N_{TA}$), a UE-specific TA value ($N_{TA,UE\text{-}specific}$), a common TA value ($N_{TA,common}$), or a TA offset value ($N_{TA,offset}$).

Aspect 45: The method of Aspect 44, wherein a reference timing of the UE-specific TA value is for: a first propagation delay on a service link between the UE and a satellite associated with the NTN, or a second propagation delay on the service link.

Aspect 46: The method of Aspect 45, wherein the reference timing of the UE-specific TA value is, for the first propagation delay, a slot in which the uplink signaling is expected to arrive at the satellite based at least in part on a true satellite position of the satellite.

Aspect 47: The method of Aspect 45, wherein the reference timing of the UE-specific TA value is, for the second propagation delay, a slot in which the downlink signaling corresponding to the reference timing of the downlink signaling is expected to arrive at the satellite based at least in part on a true satellite position of the satellite and an actual received time of the slot.

Aspect 48: The method of Aspect 45, wherein the reference timing of the UE-specific TA value is, for the first propagation delay, a slot in which the uplink signaling is expected to arrive at the satellite based at least in part on validated ephemeris information and a true satellite position of the satellite.

Aspect 49: The method of Aspect 45, wherein the reference timing of the UE-specific TA value is, for the second propagation delay, a slot in which the downlink signaling corresponding to the reference timing of the downlink signaling is expected to arrive at the satellite based at least in part on: an actual received time of the slot, validated ephemeris information with no error except for quantization, and a UE propagation model.

Aspect 50: The method of Aspect 45, wherein the reference timing of the UE-specific TA value is, for the first propagation delay, a slot in which the uplink signaling is expected to arrive at the satellite based at least in part on validated ephemeris information and a UE propagation model.

Aspect 51: The method of Aspect 45, wherein the reference timing of the UE-specific TA value is, for the second propagation delay, a slot in which the downlink signaling corresponding to the reference timing of the downlink signaling is expected to arrive at the satellite based at least in part on: an actual received time of the slot, validated ephemeris information, and a UE propagation model.

Aspect 52: The method of Aspect 44, wherein a reference timing of the common TA value is for: a first propagation delay on a feeder link between a satellite associated with the NTN and a serving gateway associated with the serving node, or a second propagation delay on the feeder link.

Aspect 53: The method of Aspect 44, wherein a reference timing of the common TA value is based at least in part on related parameters broadcast from the serving node.

Aspect 54: The method of any of Aspects 41 through 53, further comprising: transmitting, to the UE, one or more open-loop TA control related parameters for adjusting a downlink frame boundary associated with the reference timing of the downlink signaling.

Aspect 55: An apparatus for wireless communication at a device, comprising a processor; memory coupled with the processor; and instructions stored in the memory and executable by the processor to cause the apparatus to perform the method of one or more of Aspects 1-13 and 27-40.

Aspect 56: A device for wireless communication, comprising a memory and one or more processors coupled to the memory, the one or more processors configured to perform the method of one or more of Aspects 1-13 and 27-40.

Aspect 57: An apparatus for wireless communication, comprising at least one means for performing the method of one or more of Aspects 1-13 and 27-40.

Aspect 58: A non-transitory computer-readable medium storing code for wireless communication, the code comprising instructions executable by a processor to perform the method of one or more of Aspects 1-13 and 27-40.

Aspect 59: A non-transitory computer-readable medium storing a set of instructions for wireless communication, the set of instructions comprising one or more instructions that, when executed by one or more processors of a device, cause the device to perform the method of one or more of Aspects 1-13 and 27-40.

Aspect 60: An apparatus for wireless communication at a device, comprising a processor; memory coupled with the processor; and instructions stored in the memory and executable by the processor to cause the apparatus to perform the method of one or more of Aspects 14-26 and 41-54.

Aspect 61: A device for wireless communication, comprising a memory and one or more processors coupled to the memory, the one or more processors configured to perform the method of one or more of Aspects 14-26 and 41-54.

Aspect 62: An apparatus for wireless communication, comprising at least one means for performing the method of one or more of Aspects 14-26 and 41-54.

Aspect 63: A non-transitory computer-readable medium storing code for wireless communication, the code comprising instructions executable by a processor to perform the method of one or more of Aspects 14-26 and 41-54.

Aspect 64: A non-transitory computer-readable medium storing a set of instructions for wireless communication, the set of instructions comprising one or more instructions that, when executed by one or more processors of a device, cause the device to perform the method of one or more of Aspects 14-26 and 41-54.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
 - one or more memories; and
 - one or more processors, coupled to the one or more memories, configured to cause the UE to:
   - receive, from a serving node of a non-terrestrial network (NTN), one or more timing advance (TA) values; and
   - transmit, to the serving node of the NTN, uplink signaling based at least in part on a reference timing for the uplink signaling, wherein the reference timing for the uplink signaling is based at least in part on a reference timing of a downlink signaling, and based at least in part on the one or more TA values, wherein the one or more TA values include a UE-specific TA value, wherein a reference timing of the UE-specific TA value is in accordance with a first propagation delay, wherein the first propagation delay is in accordance with an expected arrival time of the uplink signaling, on a service link between the UE and a satellite associated with the NTN, and wherein a reference timing of the UE-specific TA value is in accordance with a second propagation delay, wherein the second propagation delay is in accordance with an expected arrival time of the downlink signaling, on the service link.

2. The apparatus of claim 1, wherein the expected arrival time of the uplink signaling is a slot in which the uplink signaling is expected to arrive at the satellite based at least in part on validated ephemeris information and a reference propagation model.

3. The apparatus of claim 1, wherein the expected arrival time of the downlink signaling is a slot in which the downlink signaling, corresponding to a slot of the uplink signaling, is expected to arrive at the satellite based at least in part on validated ephemeris information and a reference propagation model.

4. The apparatus of claim 3, wherein the reference timing of the UE-specific TA value is based at least in part on an actual received time of the slot.

5. The apparatus of claim 1, wherein the reference timing of the downlink signaling is a downlink slot corresponding to an uplink slot associated with the uplink signaling.

6. The apparatus of claim 1, wherein the reference timing for the uplink signaling is the reference timing of the downlink signaling minus a total of the one or more TA values multiplied by a basic time unit (Tc).

7. The apparatus of claim 1, wherein the one or more TA values include one or more of a TA value (NTA), a common TA value (NTA,common), or a TA offset value (NTA,offset).

8. The apparatus of claim 7, wherein a reference timing of the common TA value is based at least in part on related parameters received from the serving node.

9. The apparatus of claim 1, wherein the reference timing of the UE-specific TA value, for the first propagation delay, is a slot in which the uplink signaling is expected to arrive at the satellite based at least in part on a true satellite position of the satellite.

10. The apparatus of claim 1, wherein the reference timing of the UE-specific TA value, for the second propagation delay, is a slot in which the downlink signaling corresponding to the reference timing of the downlink signaling is expected to arrive at the satellite based at least in part on a true satellite position of the satellite and an actual received time of the slot.

11. The apparatus of claim 1, wherein the reference timing of the UE-specific TA value, for the first propagation delay, is a slot in which the uplink signaling is expected to arrive at the satellite based at least in part on validated ephemeris information and a true satellite position of the satellite.

12. The apparatus of claim 1, wherein the reference timing of the UE-specific TA value, for the second propagation delay, is a slot in which the downlink signaling is expected to arrive at the satellite based at least in part on an actual received time of the slot, validated ephemeris information with no error except for quantization, and a reference propagation model.

13. The apparatus of claim 1, wherein the one or more processors are configured to cause the UE to:
 - receive, from the serving node, one or more open-loop TA control related parameters; and
 - adjust a downlink frame boundary associated with the reference timing of the downlink signaling based at least in part on the one or more open-loop TA control related parameters.

14. An apparatus for wireless communication at a serving node, comprising:
 - one or more memories; and
 - one or more processors coupled to the one or more memories, configured to cause the serving node to:
   - output one or more timing advance (TA) values; and
   - obtain uplink signaling based at least in part on a reference timing for the uplink signaling, wherein the reference timing for the uplink signaling is based at least in part on a reference timing of a downlink signaling and based at least in part on the one or more TA values, wherein the one or more TA values include a user equipment (UE)-specific TA value, wherein a reference timing of the UE-specific TA value is in accordance with a first propagation delay, wherein the first propagation delay is in accordance with an expected arrival time of the uplink signaling, on a service link between the UE and a satellite associated with a non-terrestrial network (NTN), and wherein a reference timing of the UE-specific TA value is in accordance a second propagation delay, wherein the second propagation delay is in accordance with an expected arrival time of the downlink signaling, on the service link.

15. The apparatus of claim 14, wherein the expected arrival time of the uplink signaling is a slot in which the uplink signaling is expected to arrive at the satellite based at least in part on validated ephemeris information and a reference propagation model.

16. The apparatus of claim 14, wherein the expected arrival time of the downlink signaling is a slot in which the downlink signaling, corresponding to a slot of the uplink signaling, is expected to arrive at the satellite based at least in part on validated ephemeris information and a reference propagation model.

17. The apparatus of claim 16, wherein the reference timing of the UE-specific TA value is based at least in part on an actual received time of the slot.

18. The apparatus of claim 14, wherein the reference timing of the downlink signaling is a downlink slot corresponding to an uplink slot associated with the uplink signaling.

19. The apparatus of claim 14, wherein the reference timing for the uplink signaling is the reference timing of the downlink signaling minus a total of the one or more TA values multiplied by a basic time unit (Tc).

20. The apparatus of claim 14, wherein the one or more TA values include one or more of a TA value (NTA), a common TA value (NTA,common), or a TA offset value (NTA,offset).

21. The apparatus of claim 20, wherein a reference timing of the common TA value is based at least in part on related parameters broadcast from the serving node.

22. The apparatus of claim 14, wherein the reference timing of the UE-specific TA value, for the first propagation delay, is a slot in which the uplink signaling is expected to arrive at the satellite based at least in part on a true satellite position of the satellite.

23. The apparatus of claim 14, wherein the reference timing of the UE-specific TA value, for the second propagation delay, is a slot in which the downlink signaling corresponding to the reference timing of the downlink signaling is expected to arrive at the satellite based at least in part on a true satellite position of the satellite and an actual received time of the slot.

24. The apparatus of claim 14, wherein the reference timing of the UE-specific TA value, for the first propagation delay, is a slot in which the uplink signaling is expected to arrive at the satellite based at least in part on validated ephemeris information and a true satellite position of the satellite.

25. The apparatus of claim 14, wherein the reference timing of the UE-specific TA value, for the second propagation delay, is a slot in which the downlink signaling corresponding to the reference timing of the downlink signaling is expected to arrive at the satellite based at least in part on an actual received time of the slot, validated ephemeris information with no error except for quantization, and a reference propagation model.

26. The apparatus of claim 14, wherein the one or more processors are configured to cause the serving node to:

output one or more open-loop TA control related parameters to adjust a downlink frame boundary associated with the reference timing of the downlink signaling.

27. A method of wireless communication performed by a user equipment (UE), comprising:

receiving, from a serving node of a non-terrestrial network (NTN), one or more timing advance (TA) values; and transmitting, to the serving node of the NTN, uplink signaling based at least in part on a reference timing for the uplink signaling, wherein the reference timing for the uplink signaling is based at least in part on a reference timing of a downlink signaling and based at least in part on the one or more TA values, wherein the one or more TA values include a UE-specific TA value, wherein a reference timing of the UE-specific TA value is in accordance with a first propagation delay, wherein the first propagation delay is in accordance with an expected arrival time of the uplink signaling, on a service link between the UE and a satellite associated with the NTN, and wherein a reference timing of the UE-specific TA value is in accordance a second propagation delay, wherein the first second propagation delay is in accordance with an expected arrival time of the downlink signaling, on the service link.

28. The method of claim 27, wherein the expected arrival time of the uplink signaling is a slot in which the uplink signaling is expected to arrive at the satellite based at least in part on validated ephemeris information and a reference propagation model.

29. The method of claim 27, wherein the expected arrival time of the downlink signaling is a slot in which the downlink signaling, corresponding to a slot of the uplink signaling, is expected to arrive at the satellite based at least in part on validated ephemeris information and a reference propagation mode.

30. A method of wireless communication performed by a serving node, comprising:

outputting one or more timing advance (TA) values; and obtaining uplink signaling based at least in part on a reference timing for the uplink signaling, wherein the reference timing for the uplink signaling is based at least in part on a reference timing of a downlink signaling and based at least in part on the one or more TA values, wherein the one or more TA values include a user equipment (UE)-specific TA value, wherein a reference timing of the UE-specific TA value is in accordance with a first propagation delay, wherein the first propagation delay is in accordance with an expected arrival time of the uplink signaling, on a service link between the UE and a satellite associated with a non-terrestrial network (NTN), and wherein a reference timing of the UE-specific TA value is in accordance with a second propagation delay, wherein the second propagation delay is in accordance with an expected arrival time of the downlink signaling, on the service link.

* * * * *